US008517740B2

(12) United States Patent
Trotta et al.

(10) Patent No.: US 8,517,740 B2
(45) Date of Patent: Aug. 27, 2013

(54) LUNG COMPLIANCE SIMULATION SYSTEM AND ASSOCIATED METHODS

(75) Inventors: Thomas Neil Trotta, Marco Island, FL (US); Siobhain Lowe, Miami, FL (US); Alberto Rodriguez, Miami, FL (US); Miguel Enrique Carvajal, Miami Springs, FL (US); Victor I. Fernandez, Miami, FL (US)

(73) Assignee: Gaumard Scientific Company, Inc., Miami, FL (US)

( * ) Notice: Subject to any disclaimer, the term of this patent is extended or adjusted under 35 U.S.C. 154(b) by 268 days.

(21) Appl. No.: 13/031,116

(22) Filed: Feb. 18, 2011

(65) Prior Publication Data

US 2012/0214144 A1 Aug. 23, 2012

(51) Int. Cl.
*G09B 23/28* (2006.01)
(52) U.S. Cl.
USPC ............................................................ 434/267
(58) Field of Classification Search
USPC .................... 434/262, 265, 267, 268, 272
See application file for complete search history.

(56) References Cited

U.S. PATENT DOCUMENTS

| | | | |
|---|---|---|---|
| 4,134,218 A | 1/1979 | Adams et al. | |
| 4,167,070 A * | 9/1979 | Orden | 434/272 |
| 4,351,344 A | 9/1982 | Stenzler | |
| 4,430,893 A * | 2/1984 | Barkalow | 73/168 |
| 5,597,310 A * | 1/1997 | Edde | 434/272 |
| 5,853,292 A | 12/1998 | Eggert et al. | |
| 5,900,438 A | 5/1999 | Miyoshi et al. | |
| 6,068,602 A | 5/2000 | Tham et al. | |
| 6,193,519 B1 | 2/2001 | Eggert et al. | |
| 6,296,490 B1 * | 10/2001 | Bowden | 434/265 |
| 6,443,735 B1 | 9/2002 | Eggert et al. | |
| 6,485,308 B1 | 11/2002 | Goldstein | |
| 6,503,087 B1 | 1/2003 | Eggert et al. | |
| 6,527,558 B1 | 3/2003 | Eggert et al. | |
| 6,568,941 B1 | 5/2003 | Goldstein | |
| 6,758,676 B2 | 7/2004 | Eggert et al. | |
| 6,780,017 B2 * | 8/2004 | Pastrick et al. | 434/265 |

(Continued)

FOREIGN PATENT DOCUMENTS

JP 2008/150447 A 7/2008
KR 10/0301711 B1 3/2003

(Continued)

OTHER PUBLICATIONS

WIPO International Searching Authority, Search Report for PCT/US2011/025055, Feb. 16, 2011, 3 pages.

(Continued)

*Primary Examiner* — Kurt Fernstrom
(74) *Attorney, Agent, or Firm* — Haynes and Boone, LLP

(57) ABSTRACT

A patient simulator system for teaching patient care is provided. The system includes a patient simulator. The patient simulator includes a patient body comprising one or more simulated body portions. The one or more simulated body portions include a lung compliance simulation system in some instances. In that regard, the lung compliance system is configured to be used with an external ventilator, including positive end-expiratory pressure (PEEP) and assisted-control ventilation. In some instances, the lung compliance system includes a lung compartment, a simulated lung positioned within the lung compartment, where the lung compartment defines an available volume for the simulated lung to expand into and where the available volume for the simulated lung to expand into is adjustable to control a compliance of the simulated lung.

27 Claims, 12 Drawing Sheets

(56) References Cited

U.S. PATENT DOCUMENTS

| | | | |
|---|---|---|---|
| 6,874,501 B1* | 4/2005 | Estetter et al. | 128/205.15 |
| 7,114,954 B2 | 10/2006 | Eggert et al. | |
| 7,976,312 B2 | 7/2011 | Eggert et al. | |
| 7,976,313 B2 | 7/2011 | Eggert et al. | |
| 8,016,598 B2 | 9/2011 | Eggert et al. | |
| 2002/0076680 A1 | 6/2002 | Logan | |
| 2002/0076681 A1 | 6/2002 | Leight et al. | |
| 2004/0110117 A1* | 6/2004 | van Oostrom et al. | 434/262 |
| 2005/0214727 A1 | 9/2005 | Stoianovici et al. | |
| 2007/0087314 A1* | 4/2007 | Gomo | 434/262 |
| 2007/0122784 A1* | 5/2007 | Carvajal | 434/267 |
| 2007/0172804 A1 | 7/2007 | Allen et al. | |
| 2007/0218442 A1 | 9/2007 | Dupuis et al. | |
| 2008/0076099 A1 | 3/2008 | Sarvazyan et al. | |
| 2008/0131855 A1 | 6/2008 | Eggert et al. | |
| 2009/0148822 A1 | 6/2009 | Eggert et al. | |
| 2011/0207102 A1 | 8/2011 | Trotta et al. | |
| 2011/0207103 A1 | 8/2011 | Trotta et al. | |
| 2011/0207104 A1 | 8/2011 | Trotta et al. | |
| 2011/0207105 A1 | 8/2011 | Eggert et al. | |
| 2011/0250578 A1* | 10/2011 | Pappin | 434/265 |
| 2012/0115119 A1* | 5/2012 | Lux et al. | 434/272 |

FOREIGN PATENT DOCUMENTS

| | | |
|---|---|---|
| WO | WO 2008/021720 A2 | 2/2008 |
| WO | WO 2009/039210 A9 | 3/2009 |
| WO | WO 2009/088304 A1 | 7/2009 |

OTHER PUBLICATIONS

WIPO International Searching Authority, Search Report for PCT/US2011/025513, Feb. 18, 2011, 4 pages.
WIPO International Searching Authority, Search Report for PCT/US2011/025515, Feb. 18, 2011, 3 pages.
WIPO International Searching Authority, Search Report for PCT/US2011/025519, Feb. 18, 2011, 5 pages.

* cited by examiner

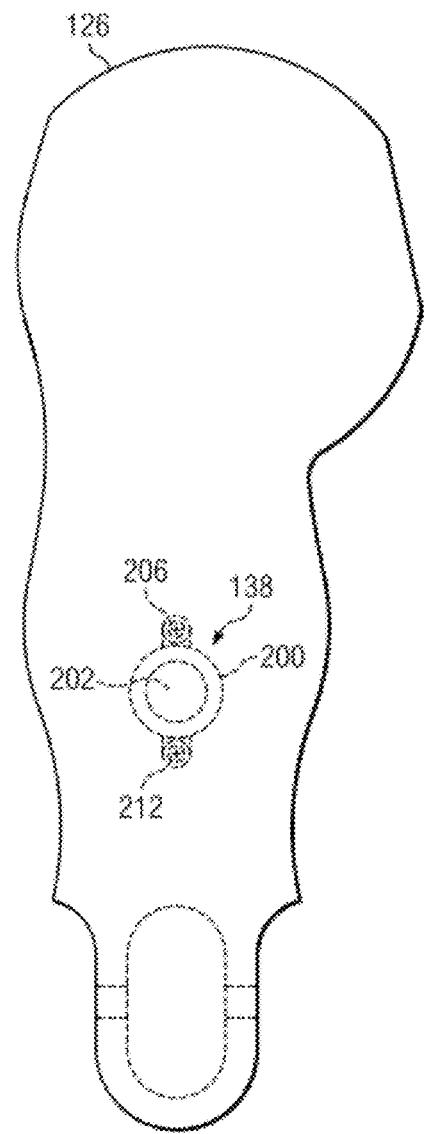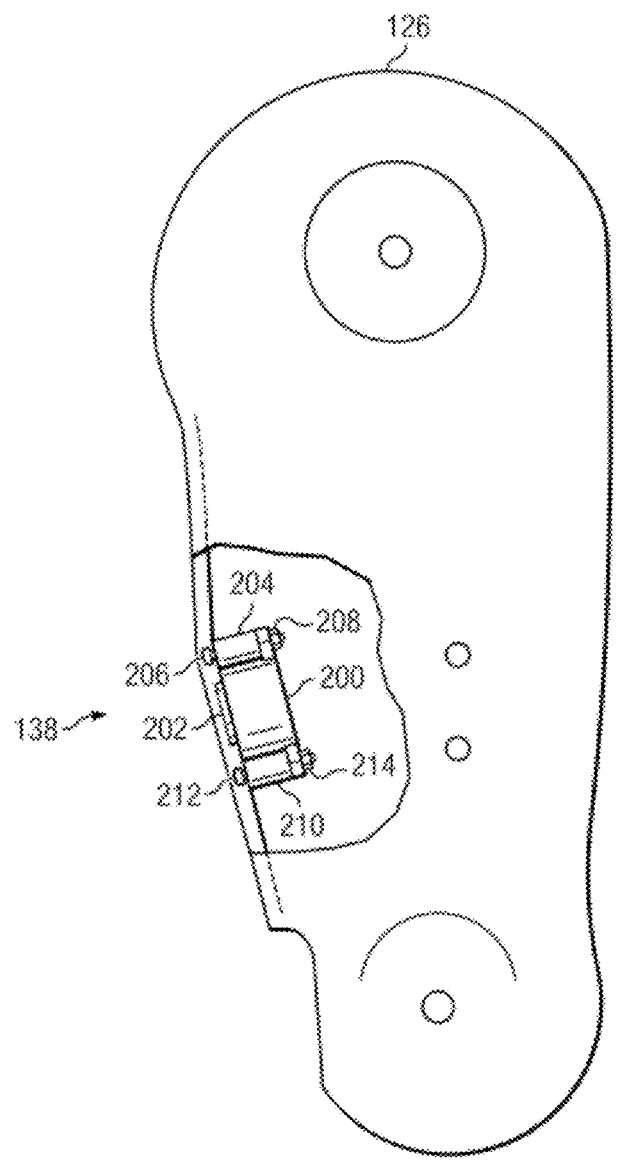
Fig. 6
Fig. 7

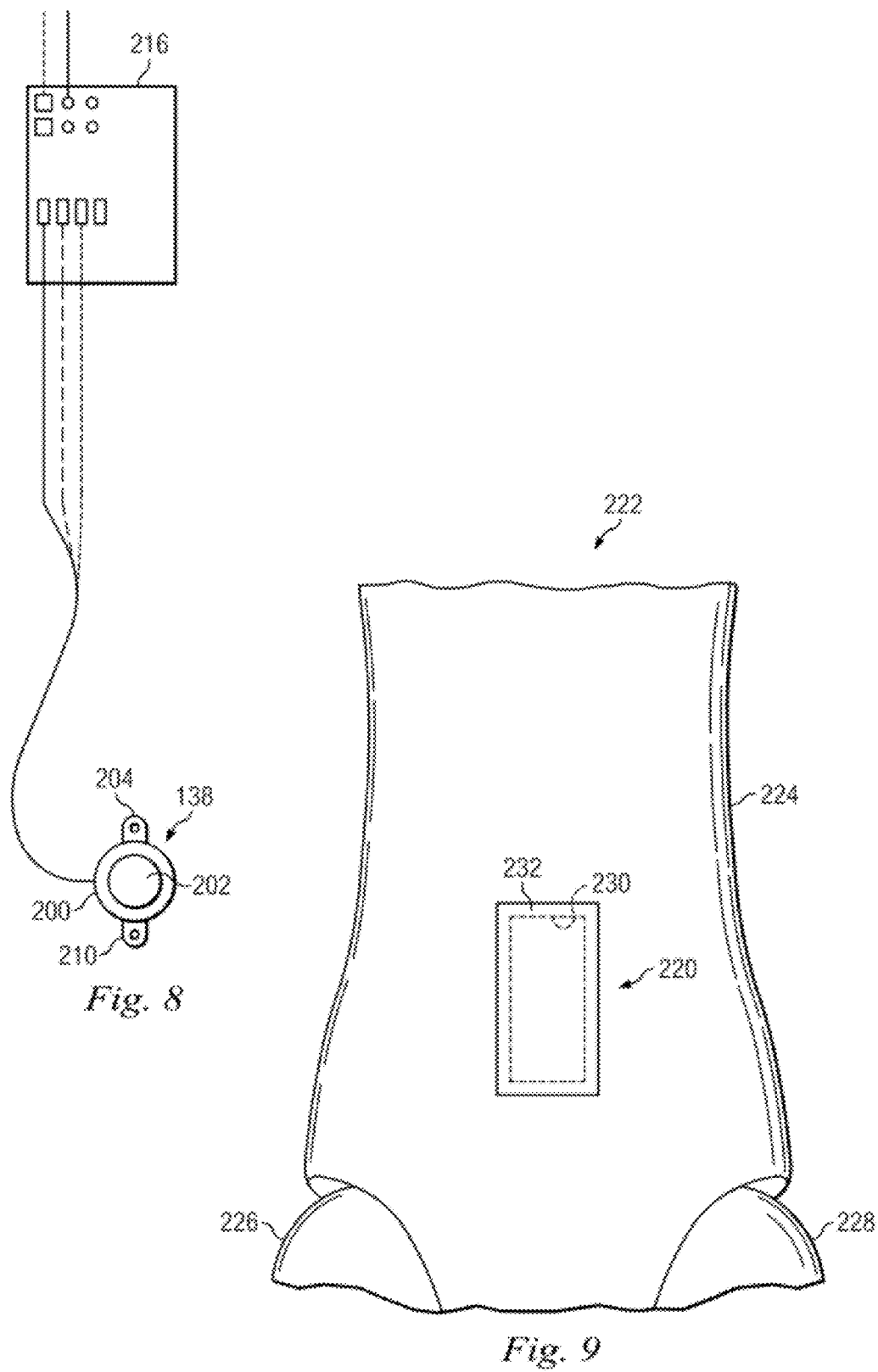

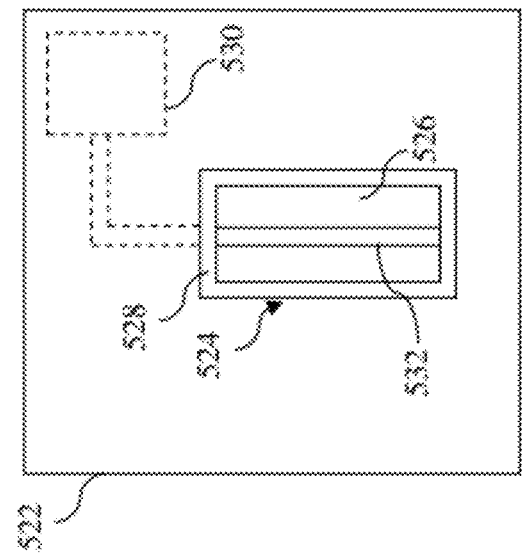
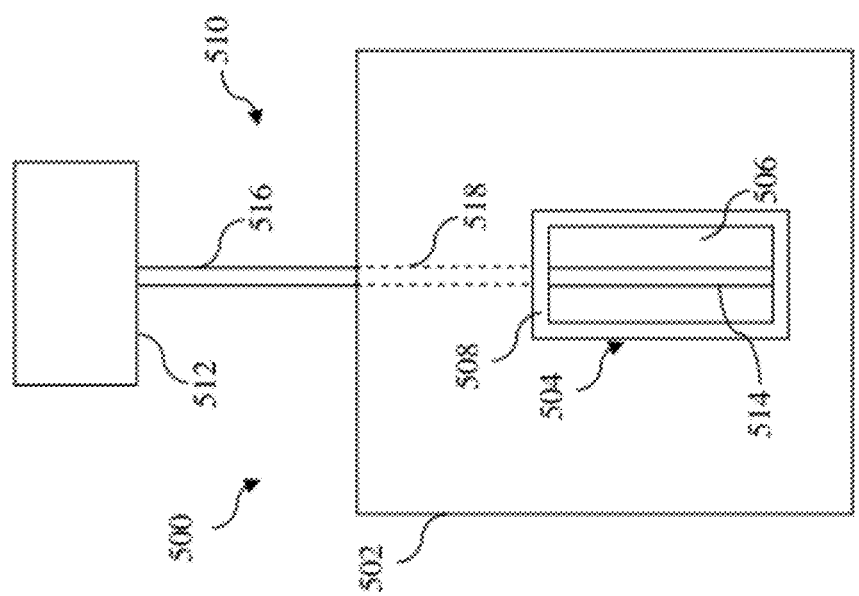

US 8,517,740 B2

LUNG COMPLIANCE SIMULATION SYSTEM AND ASSOCIATED METHODS

BACKGROUND

The present disclosure relates generally to interactive education systems for teaching patient care. While it is desirable to train medical personnel in patient care protocols before allowing contact with real patients, textbooks and flash cards lack the important benefits to students that can be attained from hands-on practice. On the other hand, allowing inexperienced students to perform medical procedures on actual patients that would allow for the hands-on practice cannot be considered a viable alternative because of the inherent risk to the patient. Because of these factors patient care education has often been taught using medical instruments to perform patient care activity on a simulator, such as a manikin. Examples of such simulators include those disclosed in U.S. patent application Ser. No. 11/952,559, U.S. patent application Ser. No. 11/952,606, U.S. patent application Ser. No. 11/952,636, U.S. patent application Ser. No. 11/952,669, U.S. patent application Ser. No. 11/952,698, U.S. Pat. No. 7,114,954, U.S. Pat. No. 6,758,676, U.S. Pat. No. 6,503,087, U.S. Pat. No. 6,527,558, U.S. Pat. No. 6,443,735, U.S. Pat. No. 6,193,519, and U.S. Pat. No. 5,853,292, each herein incorporated by reference in its entirety.

While these simulators have been adequate in many respects, they have not been adequate in all respects. Therefore, what is needed is an interactive education system for use in conducting patient care training sessions that is even more realistic and/or includes additional simulated features.

SUMMARY

The present disclosure provides interactive education systems, apparatus, components, and methods for teaching patient care.

In one embodiment, a system for teaching patient care is provided. The system includes a patient simulator with a patient body comprised of one or more simulated body portions. The one or more simulated body portions include at least one simulated finger that is configured to interface with a pulse oximeter to simulate an oxygen saturation of the patient simulator. In some instances, the simulated finger is further configured to interface with the pulse oximeter to simulate a pulse rate of the patient simulator. In some embodiments, the simulated finger includes a first sensor for receiving a first wavelength of light from the pulse oximeter, a second sensor for receiving a second wavelength of light from the pulse oximeter, and at least one light emitter for producing light at the first and second wavelengths to simulate the oxygen saturation of the patient simulator. In some instances, the at least one light emitter is positioned opposite the first and second sensors within the simulated finger. In that regard, the at least one light emitter can be separated from the first and second sensors by a divider that isolates the first and second wavelengths of light received from the pulse oximeter from the at least one light emitter. In some instances, the at least one light emitter is in communication with a processing unit configured to control the amount of light produced by the at least one light emitter at the first and second wavelengths in order to simulate the oxygen saturation of the patient simulator. The processing unit is positioned remote from the simulated finger in some instances.

In another embodiment, at least one simulated finger configured to interface with a pulse oximeter to simulate an oxygen saturation of a patient simulator is provided. The at least one simulated finger includes a first sensor for receiving a first wavelength of light emitted from the pulse oximeter, a second sensor for receiving a second wavelength of light emitted from the pulse oximeter, and a light emitter for emitting light at the first and second wavelengths from the at least one simulated finger towards a receiver of the pulse oximeter such that light received by the receiver of the pulse oximeter simulates the oxygen saturation of the patient simulator. In some instances, the first wavelength of light is between about 630 nm and about 700 nm and the second wavelength of light is between about 800 nm and about 1000 nm. In some embodiments, the light emitter includes a light emitting diode and an associated fiber optic cable. The light emitter is positioned opposite the first and second sensors within the at least one finger in some embodiments. In one particular embodiment, the light emitter and the first and second sensors are separated by a divider that isolates the first and second wavelengths of light emitted from the pulse oximeter from the receiver of the pulse oximeter when the pulse oximeter is positioned on the at least one simulated finger. The first and second sensors are mounted to the divider in some instances. In some embodiments, the light emitter is in communication with a processing unit that controls the amount of light produced by the at least one light emitter at the first and second wavelengths in order to simulate the oxygen saturation of the patient simulator. In that regard, the processing unit may be programmable to allow calibration of the amount of light produced by the at least one light emitter to match settings of the pulse oximeter such that a measured simulated oxygen saturation of the patient simulator as measured by the pulse oximeter matches a desired simulated oxygen saturation of the patient simulator. In that regard, the processing unit is programmable via a user interface in some instances. In some embodiments, the user interface is computer based and may be part of an overall user interface for controlling various aspects of the patient simulator.

In another aspect, a system for teaching patient care is provided. The system includes a simulated umbilicus. The simulated umbilicus includes a flexible elongated body defining three passageways along its length, where the three passageways simulate a vein and a pair of arteries. A reservoir housing a fluid is in fluid communication with the three passageways of the flexible elongated body. Further, an actuator positioned adjacent to the reservoir and configured to control a flow of the fluid between the reservoir and the three passageways to simulate an umbilical pulse. In some instances, the actuator includes an air valve. In some instances, the actuator further includes a bellow such that actuation of the air valve selectively inflates and deflates the bellow to control the flow of the fluid between the reservoir and the three passageways. In some instances, the bellow is configured to compress the reservoir when the bellow is inflated in order to urge fluid out of the reservoir and into the passageways. In some embodiments, the simulated umbilicus is sized and shaped for insertion into an opening in a torso of a patient simulator, such as a newborn patient simulator. In that regard, the simulated umbilicus may be a disposable component of the patient simulator. In some instances, the newborn patient simulator is configured for use with a maternal patient simulator in order to simulate a child birthing scenario. In some embodiments, each of the three passageways may be cannulated using standard techniques for cannulating a vein or artery of a natural umbilicus. The simulated umbilicus may be used to train medical personnel on a proper technique for cutting a natural umbilicus. In some instances, the simulated umbilicus is configured for use with an umbilical clamp such that when the umbilical clamp is properly applied to the flexible elongated body the umbilical clamp prevents the fluid from the reservoir flowing distally beyond the umbilical clamp.

In another embodiment, an apparatus is provided. The apparatus comprises a flexible elongated body sized and shaped to simulate a natural umbilicus. The flexible elongated body extends from a proximal portion to a distal portion and has three passageways extending along a majority of a length of the flexible elongated body. The three passageways of the flexible elongated body simulate a vein and a pair of arteries of the natural umbilicus. The apparatus further includes a reservoir positioned adjacent to the proximal portion of the flexible elongated body. The reservoir houses a fluid and is in fluid communication with the flexible elongated body. A flow of the fluid between the reservoir and the flexible elongated body simulates an umbilical pulse. In some instances, the flexible elongated body is configured for use with an umbilical clamp such that when the umbilical clamp is properly applied to the flexible elongated body the umbilical clamp prevents the fluid from flowing distally beyond the umbilical clamp. Further, in some instances, each of the three passageways may be cannulated using standard techniques for cannulating a vein or artery of a natural umbilicus. In some embodiments, the flexible elongated body is configured to train medical personnel on a proper technique for cutting a natural umbilicus. In some embodiments, the apparatus includes an actuator movable to selectively actuate the flow of the fluid between the reservoir and the flexible elongated body to simulate the umbilical pulse. In that regard, the actuator comprises an inflatable member positioned adjacent to the reservoir such that inflation of the inflatable member causes the inflatable member to compress at least a portion of the reservoir in some embodiments.

In another embodiment, an epidural training device is provided. The epidural training device includes a simulated skin layer, a simulated fat layer, a simulated tissue layer, and at least one simulated vertebra. At least a portion of the simulated tissue layer and the simulated vertebra define a cavity simulating an epidural space. In some instances, the simulated tissue layer includes simulated muscle tissue and/or simulated connective tissue. In some embodiments, the cavity simulating the epidural space is configured to receive a fluid injection. In some instances, the simulated tissue layer comprises a mixture of a silicone foam and a silicone oil. In some instances, the simulated skin layer comprises a silicone thermoset. In some instances, the epidural training device is sized and shaped for insertion into an opening in a lumbar region of a patient simulator. The epidural training device includes a mechanism for indicating injection of an epidural needle outside of a desired epidural path. In some instances, the mechanism is configured to activate at least one of a visual signal and an audible signal upon the epidural needle going outside of the desired epidural path. In some embodiments, the mechanism includes a sensor for detecting a position the epidural needle.

In another embodiment, a patient simulator is provided. The patient simulator includes a simulated portion of a lumbar spine defining a simulated epidural space. The simulated portion of the lumbar spine is formed of materials mimicking at least the tactile characteristics of a natural lumbar spine such that injection of an epidural needle into the simulated portion of the lumbar spine mimics a tactile feel associated with injection of the epidural needle into the natural lumbar spine. The simulated portion of the lumbar spine includes a simulated skin layer, a simulated fat layer, a simulated tissue layer, and at least one simulated lumbar vertebra in some instances. In some embodiments, the patient simulator is a maternal simulator with movable leg portions. In some instances, the simulated portion of the lumbar spine is a removable portion of the patient simulator. In that regard, the patient simulator may include a recess sized and shaped to receive the simulated portion of the lumbar spine.

In another embodiment, a method of simulating an epidural injection is provided. The method includes obtaining a simulated portion of a lumbar spine defining a simulated epidural space. The simulated portion of the lumbar spine is formed of materials mimicking at least the tactile characteristics of a natural lumbar spine such that injection of an epidural needle into the simulated portion of the lumbar spine mimics a tactile feel associated with injection of the epidural needle into the natural lumbar spine. The method further includes injecting an epidural needle into the simulated portion of the lumbar spine to simulate an epidural injection. In some instances, the method includes actuating a warning signal if the epidural needle is positioned outside of a desired epidural path. In some embodiments, actuating the warning signal comprises generating at least one of a visual signal and an audible signal. In some instances, the method includes removing a plunger from the epidural needle and attaching a catheter to the epidural needle.

In another embodiment a system for teaching patient care is provided. The system comprises a patient simulator that includes a patient body having one or more simulated body portions. The one or more simulated body portions includes at least one simulated arm portion. The at least one simulated arm portion is configured to interface with a standard blood pressure cuff to simulate a blood pressure of the patient simulator. In some instances, the at least one simulated arm portion includes a sensor for monitoring a force applied to the arm by the blood pressure cuff. The sensor is a load sensor, pressure sensor, or other suitable sensor. In one embodiment, the sensor is a load sensor and deflection of a portion of the load sensor is indicative of the pressure applied to the arm. In some instances, the sensor is positioned beneath a simulated skin layer of the at least one simulated arm portion. Further, in some embodiments the sensor is in communication with a processing module. The processing module may be programmable to coordinate the force applied to the arm by the blood pressure cuff as measured by the sensor with a corresponding pressure measurement of the blood pressure cuff. In some instances, the processing module controls production of one or more sounds based on the force applied to the arm by the blood pressure cuff. For example, the one or more sounds may include Korotkoff sounds, brachial pulse, radial pulse, and other related blood pressure sounds. In that regard, the at least one simulated arm portion includes one or more speakers for producing the one or more sounds in some instances. The processing module is positioned remote from the at least one simulated arm portion in some embodiments.

In another embodiment an apparatus comprises a simulated arm configured to interface with a standard blood pressure cuff such that a simulated blood pressure of the simulated arm is measurable by the standard blood pressure cuff. The simulated arm includes a load sensor for monitoring a pressure applied to the simulated arm by the standard blood pressure cuff. The simulated arm is attached to a simulated torso of a patient simulator in some embodiments. A processing module in communication with the load sensor in some instances. In that regard, the processing module may be programmable to correlate the pressure applied to the simulated arm by the standard blood pressure cuff with a pressure reading of the standard blood pressure cuff. The processing module is positioned within the simulated arm in some instances. The processing module is programmable through a computer-based user interface, such as a patient simulator user interface, in some embodiments.

In another aspect of the present disclosure, a method includes obtaining a simulated arm configured to interface with a standard blood pressure cuff such that a simulated blood pressure of the simulated arm is measurable by the standard blood pressure cuff, the simulated arm including a load sensor for monitoring a pressure applied to the simulated arm by the standard blood pressure cuff; interfacing a standard blood pressure cuff with the simulated arm; and utilizing the standard blood pressure cuff while interfaced with the simulated arm to take the simulated blood pressure of the simulated arm. In some instances, the method also includes correlating the pressure applied to the simulated arm by the standard blood pressure cuff with a pressure reading of the standard blood pressure cuff for at least two different pressures.

In accordance with another embodiment of the present disclosure, a system for teaching patient care is provided. The system includes a lung compliance simulation system. The lung compliance simulation system comprises a lung compartment and a simulated lung positioned within the lung compartment. The simulated lung is inflatable and deflatable. The lung compartment defines an available volume for the simulated lung to expand into and the available volume is adjustable to control a compliance of the simulated lung. The lung compliance simulation system further includes a compression bag positioned within the lung compartment adjacent to the simulated lung in some instances. The compression bag is inflatable and deflatable to adjust the available volume for the simulated lung to expand into. The compression bag is in fluid communication with a source of pressurized air in some instances. In some embodiments, the lung compliance system further includes a control valve for controlling an air pressure within the compression bag. The control valve is positioned between the compression bag and the source of pressurized air in some instances. In some embodiments, the lung compliance system is positioned within a patient simulator. The patient simulator includes a simulated head having at least one of a simulated mouth and a simulated nose in some instances. In that regard, in some embodiments the patient simulator further includes a simulated airway connecting the simulated lung to at least one of the simulated mouth and the simulated nose. Further, the patient simulator and the lung compliance system are configured to interface with a ventilator in some instances. In one particular embodiment, the ventilator is a bag valve mask.

In another embodiment, an apparatus comprises: a lung compartment defining a maximum volume; a first bag positioned within the lung compartment, the first bag being inflatable and deflatable to simulate functioning of a natural lung; a second bag positioned within the lung compartment adjacent to the first bag, the second bag being inflatable and deflatable to occupy varying amounts of the maximum volume in order to control a simulated lung compliance of the first bag. The first and second bags are formed of latex in some instances. The lung compartment is formed of a material that is less flexible than latex in some instances. Generally, increasing the amount of the maximum volume occupied by the second bag decreases the simulated lung compliance of the first bag, while decreasing the amount of the maximum volume occupied by the second bag increases the simulated lung compliance of the first bag. In some instances, the apparatus includes a control valve in communication with a source of pressurized air and the second bag that controls a volume of the second bag.

In another embodiment, a patient simulator includes right and left lung compliance simulations. For example, one patient simulator is comprised of: a right lung compartment; a simulated right lung positioned within the right lung compartment, the simulated right lung being inflatable and deflatable to simulate functioning of a natural lung; a right compression bag positioned within the right lung compartment adjacent to the simulated right lung, the right compression bag being inflatable and deflatable to occupy varying amounts of the right lung compartment in order to control a right lung compliance of the simulated right lung; a left lung compartment; a simulated left lung positioned within the left lung compartment, the simulated left lung being inflatable and deflatable to simulate functioning of a natural lung; and a left compression bag positioned within the left lung compartment adjacent to the simulated left lung, the left compression bag being inflatable and deflatable to occupy varying amounts of the left lung compartment in order to control a left lung compliance of the simulated left lung. In some instances, the patient simulator further includes a control valve in communication with a source of pressurized air that controls a volume of each of the right and left compression bags. Further, in some instances the simulated right lung and the simulated left lung are each in communication with a simulated airway. The simulated airway leads to at least one of a simulated mouth and a simulated nose in some embodiments.

BRIEF DESCRIPTION OF THE DRAWINGS

Other features and advantages of the present disclosure will become apparent in the following detailed description of illustrative embodiments with reference to the accompanying of drawings, of which:

FIG. 6 is a front view of an arm of the patient simulator of FIG. 1 illustrating blood pressure simulation components according to one aspect of the present disclosure.

FIG. 7 is a side view of the arm of FIG. 6.

FIG. 8 is a diagrammatic schematic view of blood pressure simulation components that may be incorporated into the arm shown in FIGS. 6 and 7 according to one aspect of the present disclosure.

FIG. 9 is a rear view of a patient simulator with an epidural insert according to one embodiment of the present disclosure.

FIG. 15 is a diagrammatic schematic view of a base portion of an epidural and lumbar puncture task trainer according to one embodiment of the present disclosure.

FIG. 16 is a diagrammatic schematic view of a base portion of an epidural and lumbar puncture task trainer similar to that of FIG. 15, but illustrating an alternative embodiment of the present disclosure.

DETAILED DESCRIPTION

Figure 1:
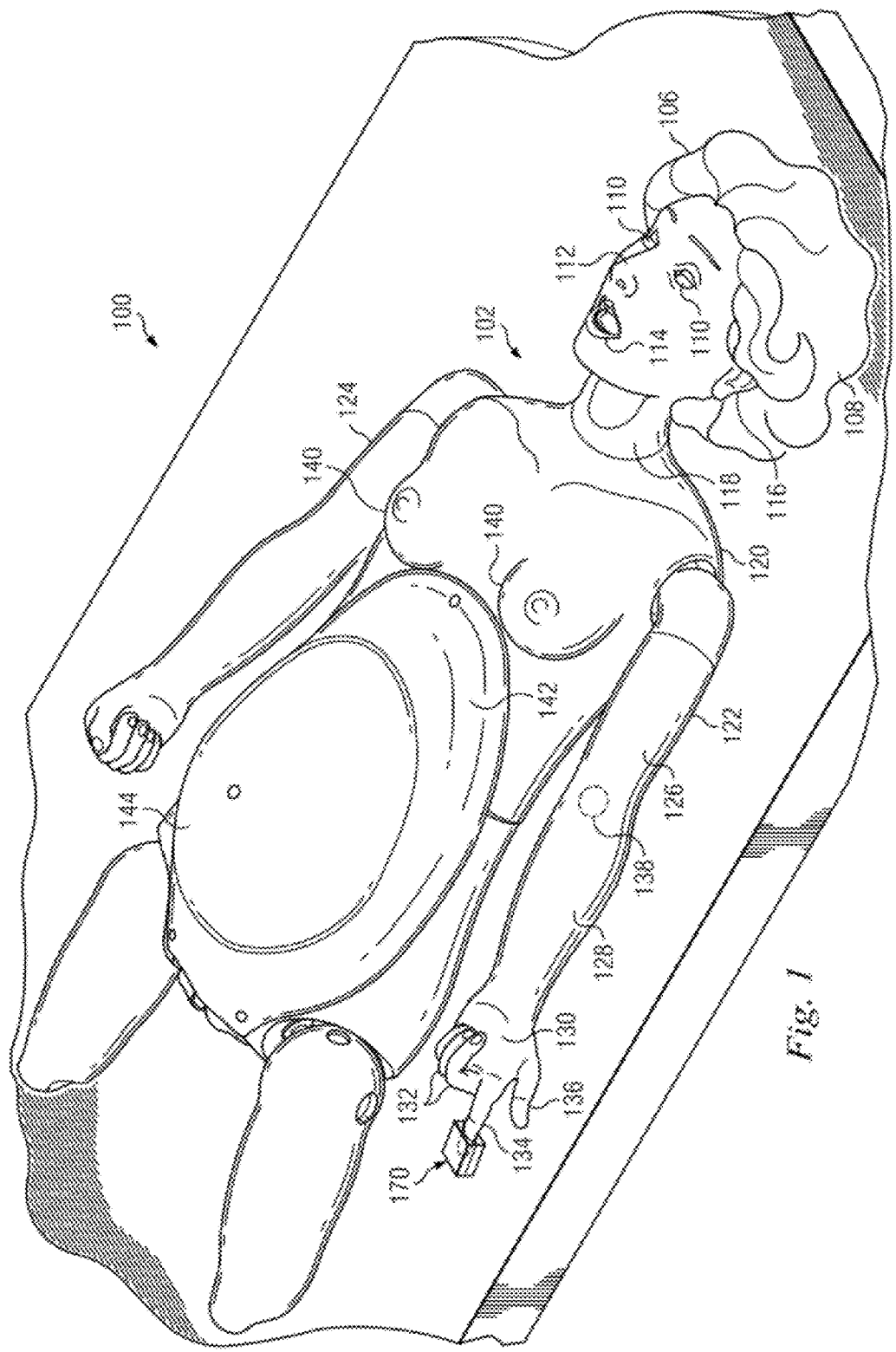
FIG. 1 is a perspective view of a patient simulator incorporating aspects of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications in the described devices, instruments, methods, and any further application of the principles of the disclosure as described herein are contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure.

Figure 2:
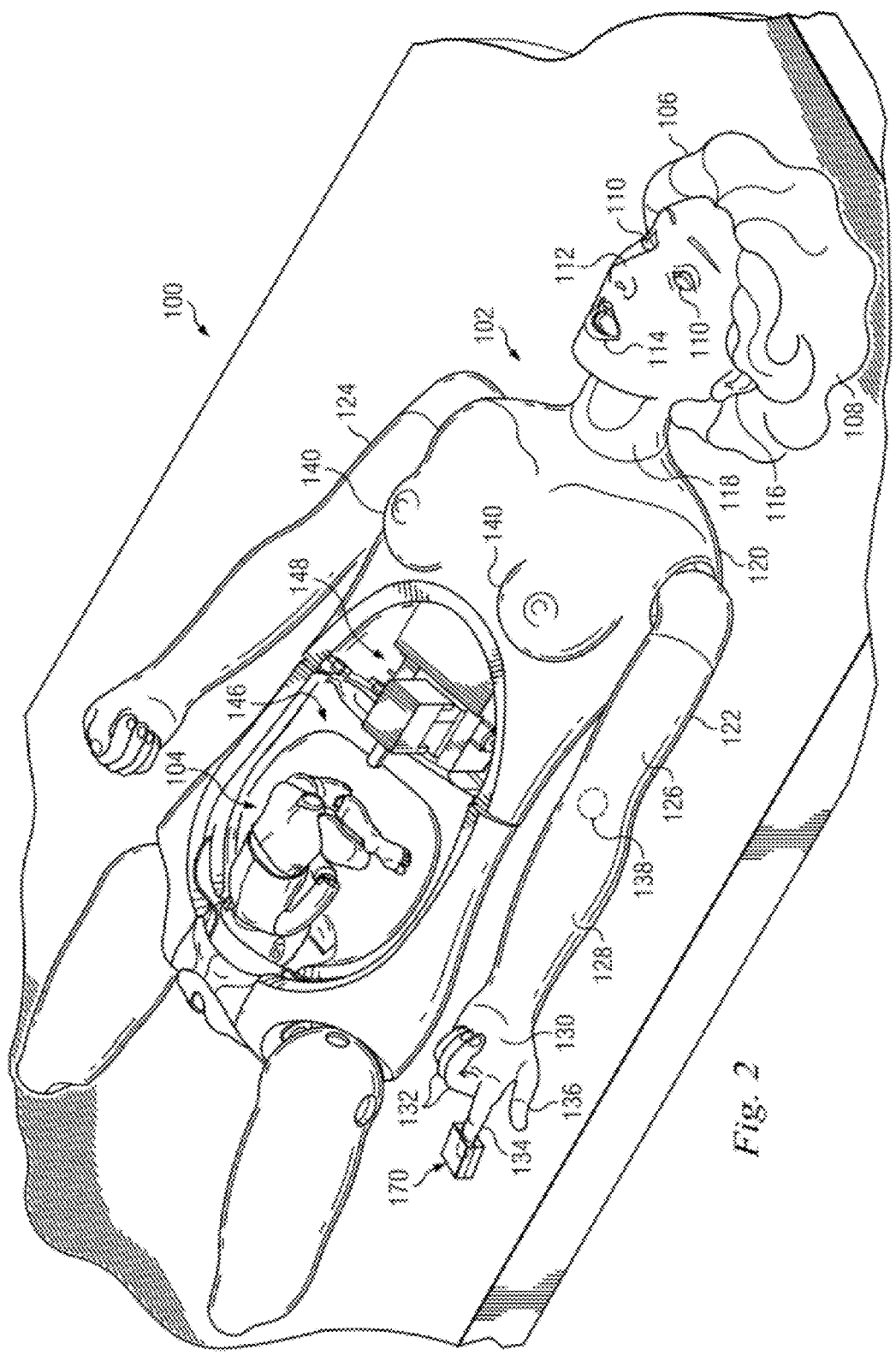
FIG. 2 is a perspective view of the patient simulator of FIG. 1, but with a front cover of the simulator removed.
Figure 3:
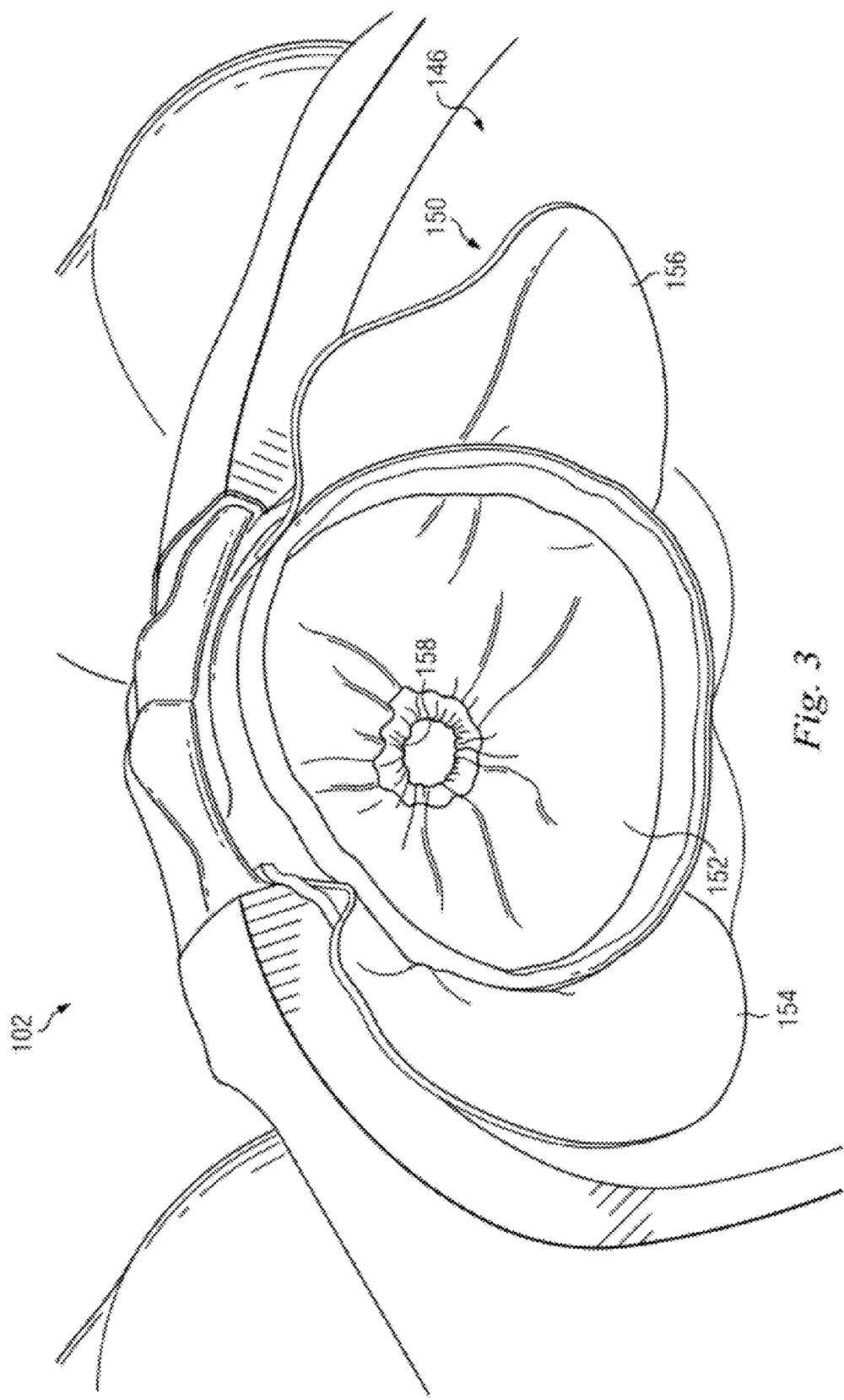
FIG. 3 is a perspective view of a portion of the patient simulator of FIG. 1 illustrating a cervix of the patient simulator.
Figure 4:
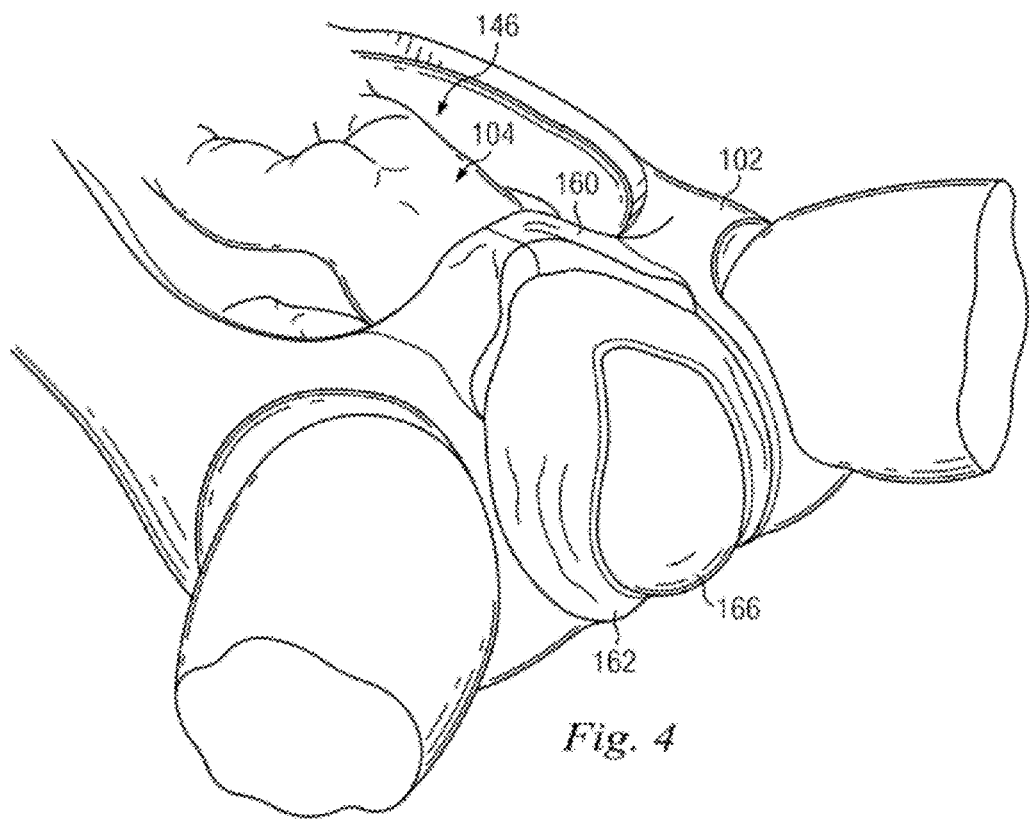
FIG. 4 is a perspective view of a portion of the patient simulator of FIG. 1 illustrating aspects of a simulated birth.

Referring now to FIGS. 1, 2, 3, and 4, shown therein is a patient simulator 100 illustrating aspects of the present disclosure. As best seen in FIG. 2, the patient simulator 100 includes a maternal simulator 102 and a fetal simulator 104. FIG. 1 is a perspective view of the patient simulator 100 with the fetal simulator 104 within the maternal simulator; FIG. 2 is a perspective view of the patient simulator 100 similar to FIG. 1, but illustrating the fetal simulator 104 disposed within the maternal simulator; FIG. 3 is a perspective view of an inner portion of the maternal simulator 102 illustrating a distensible cervix according to one embodiment of the present disclosure; and FIG. 4 is a perspective view of the patient simulator 100 illustrating a simulated birth of the fetal simulator 104 through the cervix of the maternal simulator 102.

It is understood that the illustrated embodiment of the patient simulator 100 is sized and shaped to represent a patient that will receive treatment. In that regard, the patient simulator can take a variety of forms, including a manikin sized and shaped to represent male or female patients of any size, age, and/or health, ranging from premature fetus to full-sized adults. Further, the patient simulator may include only a portion of the simulated patient (e.g., specific body parts or combinations of body parts). Accordingly, while aspects of the present disclosure are described with respect to particular embodiments of patient simulators, no limitation is intended thereby. It is understood that the features of the present disclosure may be incorporated into or utilized in conjunction with any suitable patient simulators. In some instances, aspects of the present disclosure are configured for use with the simulators and the related features disclosed in U.S. patent application Ser. No. 11/952,559, U.S. patent application Ser. No. 11/952,606, U.S. patent application Ser. No. 11/952,636, U.S. patent application Ser. No. 11/952,669, U.S. patent application Ser. No. 11/952,698, U.S. Pat. No. 7,114,954, U.S. Pat. No. 6,758,676, U.S. Pat. No. 6,503,087, U.S. Pat. No. 6,527,558, U.S. Pat. No. 6,443,735, U.S. Pat. No. 6,193,519, and U.S. Pat. No. 5,853,292, each herein incorporated by reference in its entirety.

Referring more specifically to FIG. 1, the maternal simulator 102 has a head 106, with hair 108, eyes 110, a nose 112, a mouth 114, and ears 116. A neck 118 connects the head 106 of the maternal simulator 102 to a torso 120. A left arm 122 and a right arm 124 extend from the torso 120. The left arm 122 includes an upper portion 126 and a lower portion 128 with a hand 130 extending from the lower portion. The hand 130 fingers 132, including an index finger 134 that will be discussed in greater detail below, and a thumb 136. In the illustrated embodiment, the upper portion 126 includes a sensor 138 that will be discussed in greater detail below. In some instances, the left arm 122 includes an IV receptacle 140 capable of accepting injected medications. In some instances, an RFID reader is positioned adjacent to the IV receptacle such that an RFID tag associated with an injected medication is read by the RFID reader. In some embodiments, the RFID reader can then communicate the injected medication to a control unit of the patient simulator 100. In that regard, in some instances the RFID reader also communicates the amount or dosage of injected medicine. In some embodiments, the right arm 124 is substantially similar to the left arm 122. In other embodiments, the right arm 124 contains more or less features than the left arm. In that regard, it is understood that any combination of the features disclosed herein may be utilized in an arm of a patient simulator in accordance with the present disclosure.

The torso 120 includes breasts 140 and an abdomen portion 142. The abdomen portion 142 includes a cover 144. In that regard, the cover 144 may be attached to the torso 120 via fastening means, such as snaps, hook and loop closures, buttons, adhesives, or other releasable attachment devices. As shown in FIG. 2, in some instances the cover 144 covers a cavity 146 in the torso 120 that houses various components of the patient simulator 100. In that regard, in the illustrated embodiment the fetal simulator 104 is positioned within the cavity 146 along with components 148 for controlling movement of the fetal simulator 104. In that regard, the components 148 are configured to selectively rotate, translate, and release the fetal simulator 104 in order to simulate one or more birthing scenarios. In some instances, the components 148 are further configured to monitor forces exerted on the fetal simulator during the one or more birthing scenarios.

Further, in some instances the components 148 are configured to selectively hold or release the fetal simulator 104 in order to simulate particular birthing scenarios, including but not limited to shoulder dystocia, assisted deliveries (e.g., forceps or vacuum), and breech deliveries. In some instances, the components 148 are configured to hold or maintain the fetal simulator 104 within the maternal simulator 102, or at least provide tension or resistance to removal of the fetal simulator 104 from the maternal simulator 102 in order to provide tactile sensation similar to a natural child birth. In that regard, in some instances the components 148 provide the proper tactile sensation for a particular sized fetus (e.g., average size for 40 weeks, 36 weeks, 32 weeks, 28 weeks, or other age) regardless of the actual size of the fetal simulator 104. In this manner, a single fetal simulator may be utilized to simulate a wide-range of birthing scenarios with fetuses of different ages and corresponding sizes. Alternatively, a plurality of fetal simulators of varying sizes may be provided for use with the maternal simulator 102. In some instances, the components 148 and/or other aspect of the maternal simulator 102 or related software or hardware is capable of automatically detecting the size of the fetal simulator 104 being utilized and simulates the corresponding birthing scenarios appropriately. In other instances, a user inputs the size of the fetal simulator being utilized.

In one embodiment, the cover 144 is configured to simulate contractions of the maternal simulator 102. In that regard, all or portions of the cover 144 are selectively made to feel harder or firmer to simulate a contraction. Various mechanisms may be utilized to simulate the contractions. In one embodiment, the cover 144 is in communication with a means for producing a vacuum such that activation of the vacuum creates tension across a portion of the cover making it feel harder. In another embodiment, the cover 144 includes a bladder that is in communication with a means for controlling the pressure within the bladder (e.g., an air compressor or fluid reservoir) for selectively increasing and decreasing the pressure in the bladder to simulate the contractions of the maternal simulator 102. It is understood that different levels of hardness may be produced to simulate different levels of contraction strength, for example, mild, moderate, and strong contractions. Further, it is understood that the timing of the contractions may be varied to appropriately simulate various birthing scenarios. Generally, the cover 144 is designed to obscure visualization of the fetal simulator 104 within the maternal simulator 102 to more accurately simulate the child birthing process, and more realistically challenge the user's diagnostic abilities.

In some embodiments, the maternal simulator 102 is tetherless. That is, the maternal simulator 102 is functional without wired or tubular connection to other devices outside of the simulator and, therefore, does not require wires, tubes, or other lines extending from the maternal simulator in order to be fully functional. Rather, the maternal simulator 102 is self-contained. Thus, the maternal simulator 102 can include an internal power supply, such as a rechargeable power cell, and all pneumatic and fluid connections are made to the corresponding compressors or other devices within the maternal simulator 102. As the maternal simulator 102 is self-contained, it is not only portable, but can be in use while being transported between different locations. Further, in such embodiments, the maternal simulator 102 may communicate with other devices, such as a control interface, through wireless communication. Thus, the entire simulator system can be functional up to the limits of the wireless communication. Further, in some embodiments the maternal simulator 102 connects wirelessly to a computer or network system, which then connects to other remote devices via a wired or wireless network, making the functional distance of the maternal simulator 102 virtually limitless. Similarly, in some embodiments when the fetal simulator 104 is used in as a newborn after being birthed from the maternal simulator 102, it is operable in a tetherless mode as well.

Referring more particularly to FIGS. 3 and 4, the maternal simulator 102 includes a birth canal 150 for the fetal simulator 104 to pass through to simulate a natural birth. In that regard, the birth canal 150 includes a distensible cervix 152 as well as flaps 154 and 156. In some instances, the flaps 154, 156 are configured to interface with a portion of the maternal simulator 102 in order to maintain the cervix's relative position in the cavity 146. As such, in some instances the flaps 154, 156 include snaps, hook and loop closures, and/or other reversible fastening means for securing at least the cervix 152 to the maternal simulator 102. In some embodiments, the flaps are sized and shaped to simulate corresponding anatomical features such as ovaries, fallopian tubes, and surrounding tissues. The cervix 150 defines an expandable port 158 through which the fetal simulator 104 will be birthed. In some instances, the port 158 expands from an initial configuration having a diameter of about 2 centimeters to a fully dilated configuration having a diameter between about 8 centimeters and about 12 centimeters. In some instances, in the fully dilated configuration the port 158 diameter is approximately 10 centimeters. While the size of the port 158 has been described in terms of a diameter, it is understood that the port 158 does not necessarily have a circular profile, but instead may have an oblong and/or irregular shape.

The cervix 150 is disposed in a pelvic area of the maternal simulator 102 that includes anatomical features simulating the natural pelvic area. For example, in some instances, the pelvic area includes a pubic bone area 160 and a vulva 162. It is understood that the pelvic may include features simulating a urinary tract, rectum, or other anatomical features. In that regard, the pubic bone area 160, the vulva 162, and/or other portions of the pelvic area may be inserts or components that are replaceable with other inserts or components for displaying various patient conditions.

During a birthing simulation, the fetal simulator 104 moves through the cervix 150 and out of the vulva 162. In that regard, the cervix 150 dilates from about one centimeter to about ten centimeters in diameter as the fetal simulator 104 is birthed. Because of the shape of the fetal simulator's head 166, and the elasticity of the cervix 150, dilation is automatically simulated coincident to the fetal descent. Accordingly, a user may practice measuring cervical dilation and plot labor progress as a Partograph. The elasticity of the cervix 150 may be adjusted, for example by using thicker or thinner wall material, to produce a cervix having faster or slower dilation than normal, respectively. The vulva 162 is made of a flexible material so that the user may manipulate the vulva and/or perform an episiotomy to birth the fetal simulator 104. Further, after delivery, the user may practice postpartum exercises, such as massaging a uterus insert (not depicted) back to a desirable size, removing retained placenta parts (not depicted), or repairing the cervix 150 and/or vulva 162.

In some instances, the cervix 150 and/or vulva 162 are made of materials that mimic the corresponding natural human tissue. In one embodiment, a polysiloxane mixture for simulating human biological tissue is utilized. The mixture includes a silicone foam and a silicone oil, where the silicone foam and the silicone oil are combined in a manner such that the resulting mixture has physical material properties simulating natural human biological tissue. In some instances, the silicone foam is present in an amount of about 10 to 45 percent by weight of the total mixture weight, while the silicone oil is present in an amount of about 55 to 90 percent by weight of the total mixture weight. In one particular instance, the silicone foam is present in an amount of about 25 percent by weight of the total mixture weight, while the silicone oil is present in an amount of amount of about 75 percent by weight of the total mixture weight. In some instances, the polysiloxane mixture further comprises a silicone thermoset. In some embodiments, the silicone foam and the silicone thermoset comprise a platinum catalyzed silicone. Generally, the materials disclosed in U.S. patent application Ser. No. 61/305,982, titled "POLYSILOXANE MATERIALS AND METHODS THAT MIMIC TISSUE", U.S. patent application Ser. No. 13/031,102, filed Feb. 18, 2011 and titled "BREAST TISSUE MODELS, MATERIALS, AND METHODS", and U.S. patent application Ser. No. 13/031,087, filed Feb. 18, 2011 and titled "ULTRASOUND PHANTOM MODELS, MATERIALS, AND METHODS", each of which is hereby incorporated by reference in its entirety, may be utilized to form the cervix 150, vulva 162, and/or other tissue components of the maternal and/or fetal simulator.

Figure 5:
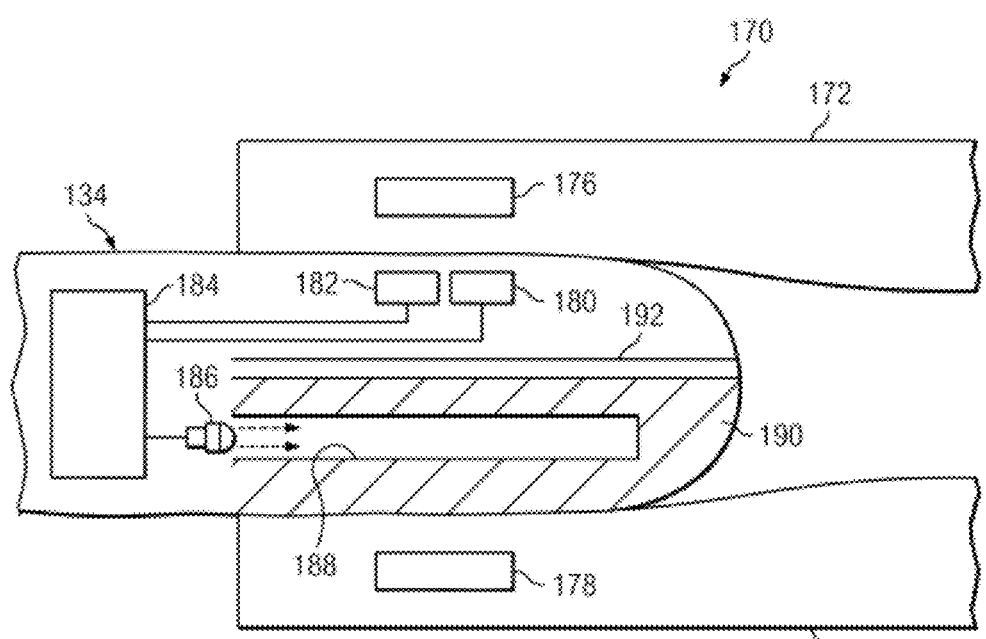
FIG. 5 is a cross-sectional side view of a finger of the patient simulator of FIG. 1 illustrating oxygen saturation simulation components according to one aspect of the present disclosure.

Referring now to FIG. 5, shown therein is a diagrammatic cross-sectional side view of a finger 134 of the patient simulator 102 of FIG. 1 according to one aspect of the present disclosure. In that regard, the finger 134 is shown with a pulse oximeter 170 attached thereto. Generally, the pulse oximeter 170 may be any commercially available pulse oximeter. As discussed in greater detail below, the finger 134 can be calibrated to properly interface with a particular pulse oximeter in order to simulate an oxygen saturation and/or pulse rate of the patient simulator. The pulse oximeter 170 is illustrated as a generic finger pulse oximeter that includes an arm 172 for positioning on one side of the finger and an arm 174 opposite arm 172 for positioning on the other side of the finger. The arms 172, 174 may be pivotally attached to one another to allow for movement during positioning of the oximeter 170 onto the finger. The arm 172 includes an emitter 176, while the arm 174 includes a receiver 178. In general, the oximeter 170 functions by emitting red and infrared light from the emitter 176 into the finger. Generally, the pulse oximeter 170 will emit a first wavelength of light between about 630 nm and about 700 nm and a second wavelength of light between about 800 nm and about 1000 nm. In a natural human finger, the relative absorption of the red and infrared light indicates the amount of oxygen in the blood. The relative absorption is determined by the amount of red an infrared light received at the receiver 178. The finger 134 is able to simulate the absorption characteristics of a natural human finger in order to allow a user to obtain oxygen saturation and pulse information for the patient simulator 102 utilizing the pulse oximeter 170.

In that regard, the simulated finger 134 includes a sensor 180 for receiving infrared light emitted from the pulse oximeter and a sensor 182 for receiving red light emitted from the pulse oximeter. The sensors 180 and 182 are in communication with a processing unit 184. While the sensors 180 and 182 are shown to be in wired communication with the processing unit 184, it is fully contemplated that the sensors be in wireless communication with the processing unit 184. In that regard, the processing unit 184 is positioned within the finger 134 in some instances. However, in other instances, the processing unit 184 is remote from the finger 134 and, in some instances, is even positioned outside of the simulator 102. The processing unit 184 is generally configured to control a light source 186. In some embodiments, the light source 186 is a red LED. The light source 186 is in optical communication with a fiber optic cable 188. As such, the light emitted from the light source 186 travels through and is emitted from the fiber optic cable 188. The fiber optic cable 188 is surrounded by a material 190 that facilitates transmission of the light. In some instances, the material 190 is silicone. In that regard, the material 190 transmits the light in such a manner that it is somewhat evenly transmitted across the surface of the finger, which best simulates a natural finger and allows for steady readings by the oximeter 170. In order to prevent the light emitted from the emitter 176 from reaching the receiver 178, the finger 134 includes a barrier 192 that prevents transmission of the light from the emitter 176. In some embodiments, the barrier 192 is a PC board. In that regard, the barrier 192 may be utilized as a mount for the sensors 180, 182 in some embodiments.

The processing unit 184 controls the intensity and timing of the light source 186 in order to simulate the oxygen saturation and/or pulse of the patient simulator 102. Due to the fact that different oximeter manufacturers utilized different wavelengths of the light, it is necessary for the processing unit to be calibrated to function properly with a particular pulse oximeter. In that regard, the processing unit 184 may be programmable to facilitate calibration of the amount of light produced by the light source 186 in order to match the corresponding settings of the pulse oximeter such that the oxygen saturation of the patient simulator as measured by the pulse oximeter matches a desired simulated oxygen saturation of the patient simulator. Accordingly, in some instances, multiple calibration points are utilized to adjust the relative output of the light source 186 so that the desired simulated oxygen saturation matches the oxygen saturation measured by the oximeter 170. In some instances, the processing unit 184 and light source 186 are calibrated at 100%, 80%, and 60% oxygen saturations. However, it is understood that any combination of points may be utilized to calibrate the processing unit 184 and light source 186 and that the greater the number of calibration points the more accurate overall the system is likely to be.

The processing unit 184 is programmable via a user interface in some instances. In some embodiments, the user interface is computer based and may be part of an overall user interface for controlling various aspects of the patient simulator. The pulse of the patient simulator 102 is simulated by pulsing the light source at the desired heart rate. In that regard, the pulse in the finger 134 is synchronized with the heart rate of the patient simulator 102. Generally, there is not a need to calibrate the processing unit 184 to control the pulse rate for different oximeters. However, it is possible to calibrate the pulse rates utilizing calibration points (i.e., different beats per minute) in a similar manner to the levels of oxygen saturation if desired.

Referring now to FIGS. 6, 7, and 8, shown therein are aspects of the upper portion 126 of the left arm 122 of the patient simulator 102. In that regard, the arm 122 includes a sensor 138 that is utilized to simulate a blood pressure of the patient simulator 102, including systolic and diastolic pressures. In that regard, the sensor 138 is configured to allow the blood pressure of the patient simulator 102 to be taken using standard blood pressure cuffs. As shown, the sensor 138 includes a main housing 200 and a sensing portion 202. The sensing portion 202 is capable of monitoring the pressure applied to the arm 122 by a blood pressure cuff. In some instances, the sensing portion 202 is a load cell. In that regard, the amount of deflection of the load cell is based on the pressure applied to the arm 122. To achieve proper deflection of the load cell, the sensor 138 must be fixed relative to the arm 122. In that regard, the sensor 138 includes a mounting extension 204 extending from the main body. The mounting extension 204 receives a fastener 206. In the illustrated embodiment, the fastener 206 is a screw that is mated with a nut 208. The sensor 138 includes another mounting extension 210 substantially opposite mounting extension 204. Again, the mounting extension 210 receives a fastener 212, which in the illustrated embodiment is a screw that is mated with a nut 214. The mounting extensions 204, 210 and fasteners 206, 212, along with the nuts 208, 214, are utilized to secure the sensor 138 in a fixed position on the arm 122. It is understood, however, that a simulated layer of skin may be present over the sensor 138 such that the sensor is not visible to a user.

Generally, the sensing portion 202 can be calibrated such that a measurement or deflection of the sensing portion 202 corresponds to a pressure measurement of the blood pressure cuff. As shown in FIG. 8, the sensor 138 is in communication with a processing module 216 in some instances. The processing module 216 is configured to monitor the loads as measured by the sensing portion 202 in some instances. In that regard, the processing module 216 is programmable to facilitate coordination of a measured load or pressure with the corresponding pressure measurement of the blood pressure cuff. In general, the load cell will produce a voltage output correlating to the measured pressure. In some instances, multiple calibration points are utilized to match the sensed values of the sensing portion 202 with the pressure readings of the blood pressure cuff based on the voltage outputs. It is understood that any number of sensed values for different pressure readings points may be utilized to calibrate the processing module 216, but that the greater the number of calibration points the more accurate overall the system is likely to be. The processing module 216 is programmable via a user interface in some instances. In some embodiments, the user interface is computer based and may be part of an overall user interface for controlling various aspects of the patient simulator.

In some instances, the measurements of the sensor 138 are utilized to determine when certain sounds should be produced by the simulator 102. For example, in some instances the measurements of the sensor 138 are utilized to determine when to play Korotkoff sounds. Further, the brachial and radial pulses may cut off per the systolic and diastolic pressures of the patient simulator 102. In this regard, the processing module 216 may be in communication with another module or controller for producing these various sounds. Alternatively, the processing module 216 itself may control a speaker or speakers for producing these sounds. In this manner, the sensor 138 and related components of the patient simulator 102 are utilized to allow a user to take the simulated blood pressure of the patient simulator in a realistic manner utilizing standard blood pressure cuffs, including tetherless blood pressure cuffs.

Figure 10:
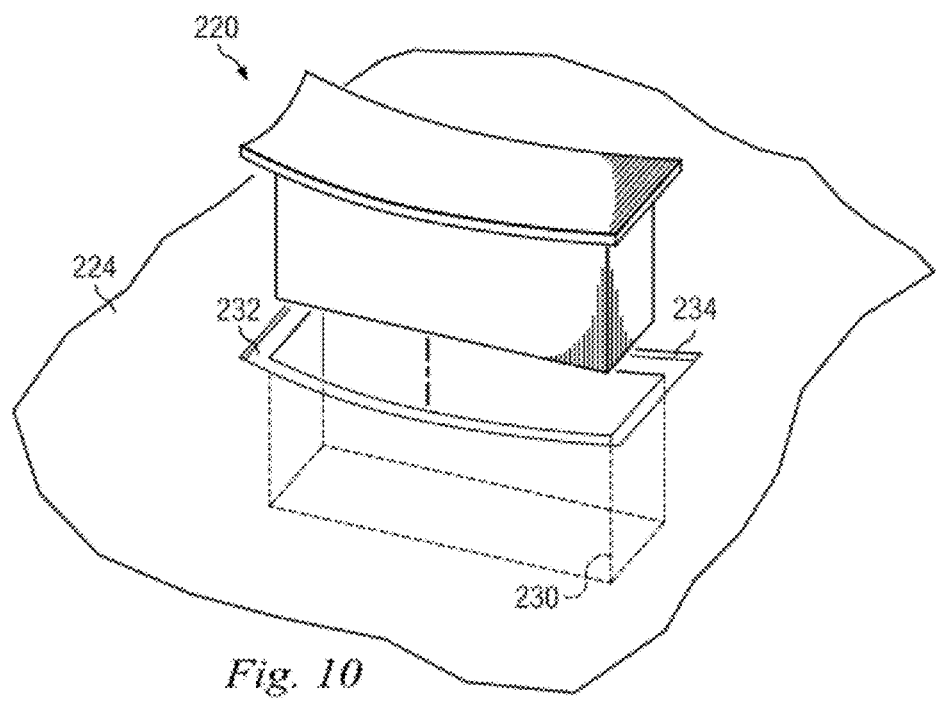
FIG. 10 is a perspective view of a portion of the patient simulator and the epidural insert of FIG. 9.
Figure 11:
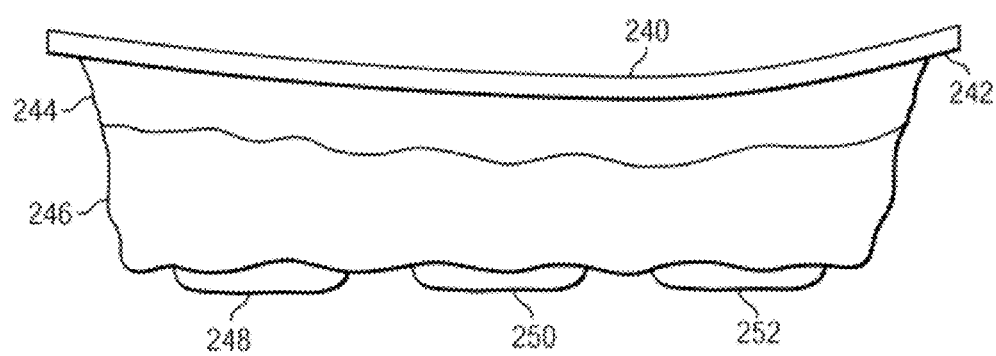
FIG. 11 is a side view of an epidural insert according to one aspect of the present disclosure.

Referring now to FIGS. 9, 10, and 11, shown therein is an epidural insert 220 in accordance with one aspect of the present disclosure. In general the epidural insert 220 is configured to train medical personnel in the proper procedures for administering an epidural injection. As a general matter, epidural injections are the administration of medication into the epidural space of the spine. Epidural injections are used to treat swelling, pain, and inflammation associated with neurological conditions that affect nerve roots, such as a herniated disc, but is frequently given during childbirth. Performing epidural injections is a complex task that demands a high level of skill and precision from the medical personnel. An improperly performed epidural injection can result in serious complications for the patient, including paralysis and, in some instances, death. Accordingly, the epidural insert 220 provides vital training without putting actual patients at risk.

In that regard, the epidural insert 220 is designed for learning, practicing, and experiencing the most common and important aspects of the epidural procedure, including identifying the appropriate location for insertion of the epidural needle, inserting the epidural needle, simulating the feel of passing the epidural needle through the different tissue layers and into the epidural space, and injecting the fluid into the epidural space. The realistic appearance, anatomically correct features, and lifelike feel of the epidural insert 220 provide a tactile feedback that substantially matches that of the natural anatomy. In that regard, the epidural insert 220 can simulate loss of resistance when using air or saline within the epidural needles. Further, the epidural insert 220 can be utilized to train medical personnel on the techniques fluid and dural taps. The epidural insert 220 provides safe means of training medical personnel how to properly perform epidural injections and provides realistic feedback to users on their technique.

As shown in FIGS. 9 and 10, in some instances the epidural insert 220 is sized and shaped for insertion into a lower back of a patient simulator 222. In particular, the epidural insert 220 is configured for insertion into the lumbar region of the spine in some instances. Generally, the patient simulator 222 includes at least a torso of the patient. In the illustrated embodiment, the patient simulator 222 includes a torso 224 and leg portions 226, 228. In that regard, in some instances the torso and leg portions 226, 228 are movable and bendable to allow for positioning of the patient simulator 222. In that regard, in some techniques the patient is asked to bend at the waste and/or bring her knees into her chest. Accordingly, in some instances the patient simulator 222 is movable to allow such positioning. Further, the torso 224 of the patient simulator 222 includes a recess or opening 230 sized to receive the epidural insert 220. In some instances, the recess 230 is positioned in the lumbar region of the spine. In the illustrated embodiment the recess 230 has a generally rectangular profile. However, it is understood that the recess 230 may take any shape, including geometrical and irregular shapes. The recess 230 is bounded by a surface 232. In some instances, the surface 232 is a skin-deep recess. That is, the surface 232 is bounded by a rim or edge 234 that is generally the thickness of the skin of the simulator 222. In that regard, the epidural insert 220 includes a simulated skin layer 240 that includes an overhang or lip 242 sized and shaped to mate with the surface 232 such that when the epidural insert is received within the recess 230, the skin layer 240 of the epidural insert and the skin layer of the torso are substantially aligned to form a continuous skin layer.

Referring more particularly to FIG. 11, the epidural insert 220 accurately models the anatomical structure of the lumbar spine, including vertebrae, surrounding muscle, fat, and connective tissue. In particular, the epidural insert includes the skin layer or simulated dermis 240 as noted above. Below the skin layer 240, is a fat layer 244 followed by a connective tissue layer 246 that includes simulated ligamentum flavum. Positioned within the connective tissue layer 246 are simulated lumbar vertebrae 248, 250, and 252. In that regard, the lumbar vertebrae 248, 250, and 252 represent vertebrae L3, L4, and L5 in some instances. In other instances, the epidural insert 220 includes other simulated vertebrae (including lumbar and/or thoracic vertebrae) and/or a simulated sacrum. In another exemplary embodiment, the insert includes simulated vertebrae representative of vertebrae L2, L3, L4, and L5.

As a general matter, the epidural insert 220 simulates the feel of realistic tissue and the placement and relative dimensions accurately reflect true human anatomical structures. Accordingly, in some instances, the insert 220 includes additional features and/or layers. On the other hand, in some instances, the insert 220 does not include separate fat and connective tissue layers 244, 246, but instead includes a general subcutaneous tissue layer. In that regard, in some instances the subcutaneous layer has varying material properties to simulate the corresponding natural tissue. In other instances, the subcutaneous layer has substantially uniform material properties throughout. The epidural insert 220 defines an epidural space that is hollow and serves as reservoir for receiving fluid injected from an epidural needle. In some instances, the epidural space is in fluid communication with a drain or a larger reservoir that allows the fluid injected into the epidural space to be removed from the direct epidural space, which allows injection of additional fluid into the epidural space. This facilitates multiple epidural simulations with the insert 220 without the need to drain or remove the injected fluid from the insert and/or simulator.

Since the procedures related to epidural injections are largely based on feel, the tactile characteristics of the materials utilized to form the various anatomical structures of the epidural insert 220 must mimic tactile characteristics of the natural tissues to be an effective training aid. In that regard, the lumbar vertebrae 248, 250, and 252 are made of a hard material to realistically represent bone, such as a hard polyurethane thermoset, Acrylonitrile butadiene styrene (ABS), polycarbonate, and high-density polyethylene (HDPE). Generally, the material has a shore hardness between about 50 D and about 90 D and, more specifically, between about 60 D and about 80 D in some instances. Further, the material is pigmented or colored to simulate natural vertebrae in some embodiments. Generally, the vertebrae 248, 250, and 252 include simulated spinous processes to allow a user to feel the vertebrae 248, 250, 252 through the skin and fat layers 140, 144 so that they can be used as reference points for determining the proper placement of the needle puncture.

The connective tissue layer 246 is made from a firm, but dense material, such as silicone thermoset. Generally, the material has a shore hardness between about 10 A and about 50 A and, more specifically, between about 20 A and 35 A in some instances. The fat layer 244 is soft and malleable, offers low frictional resistance to injection, and has good rebound and shape memory in some instances. The outer skin layer and/or the underlying tissue layer(s) are formed from a material that mimics the natural human skin. In that regard, in some instances the outer skin layer and/or the underlying tissue layer(s) are formed of materials disclosed in U.S. patent application Ser. No. 61/305,982, filed Feb. 19, 2010 and titled "POLYSILOXANE MATERIALS AND METHODS THAT MIMIC TISSUE", U.S. patent application Ser. No. 13/031,102, filed Feb. 18, 2011 and titled "BREAST TISSUE MODELS, MATERIALS, AND METHODS", and U.S. patent application Ser. No. 13/031,087, filed Feb. 18, 2011 and titled "ULTRASOUND PHANTOM MODELS, MATERIALS, AND METHODS", each of which is hereby incorporated by reference in its entirety. In particular, in one specific embodiment, the outer skin layer 140 is formed of a silicone thermoset having a Shore Hardness between about 00 and about 10 and the underlying tissue layer(s) is formed of a combination of silicone foam, silicone thermoset, and silicone oil as disclosed in some embodiments of the above-mentioned patent applications.

The materials of the epidural insert 220 allow it to be used many times without adverse effect. Further, in some instances subsequent users will not be able to tell where previous users have injected the needle. This is possible because of the superior self sealing characteristics of the silicone mixtures. The silicone mixtures automatically seal and remain intact, even after numerous needle punctures. However, eventually materials of the epidural insert 220 will give way and show signs of wear and become unsuitable for training purposes. Accordingly, in some instances, the epidural insert 220 is a disposable unit that is easily replaced by a user. Following extended use, the epidural insert 220 is simply lifted out of the recess 230 of the patient simulator 222 and a replacement epidural insert 220 is positioned within the recess.

To use the epidural insert 220, an operator first fills an epidural needle with air, saline solution, or other suitable fluid. The needle is placed in the proper position by referencing the features of the lumbar vertebrae. The needle is then advanced while applying a light pressure on the syringe plunger. In some instances, a loss of resistance to injection technique is used to identify the epidural space. The needle is inserted into the device, and when the tip of the needle enters a space of negative or neutral pressure, i.e., the epidural space, there is a loss of resistance and it will be easy to inject the fluid through the needle. The combination of materials and construction techniques in the inventive device provide this tactile feedback. The user knows when the needle has entered the epidural space when they feel a light pop or click as the needle breaches into the epidural space and the syringe plunger of the needle begins to yield to pressure.

Extreme caution must be exercised in the positioning of the needle into the epidural space. In that regard, the user must stop immediately within the narrow epidural space in order to avoid puncturing the dura mater, which can cause grave patient complications in real life situations. In some instances, the epidural insert 220 includes a mechanism for indicating injection of an epidural needle outside of a desired epidural path. In some instances, the mechanism is configured to activate at least one of a visual signal and an audible signal upon the epidural needle going outside of the desired epidural path. In that regard, the mechanism includes a sensor for detecting a position the epidural needle in some instances. In one embodiment, the sensor includes a snap-action lever switch that is actuated upon contact by the needle. In other instances, visual monitors are utilized to monitor the position of the needle and/or activate an alert. Once the needle is positioned within the epidural space, the syringe and plunger may be removed and flexible catheter tubing inserted into the epidural needle. In typical use, the flexible catheter tubing would be used to inject additional medication into the epidural space, if needed.

Figure 12:
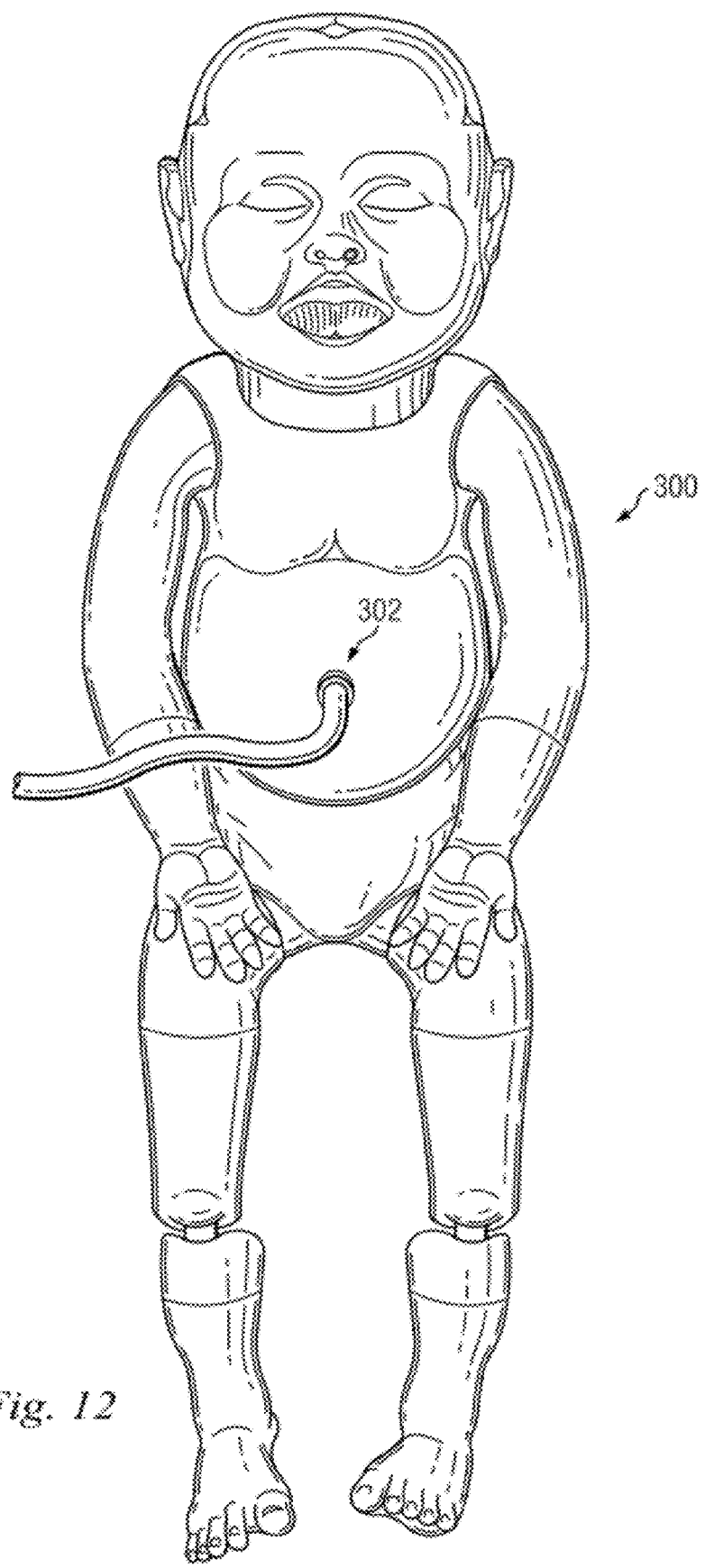
FIG. 12 is a perspective view of a patient simulator incorporating aspects of the present disclosure.
Figure 13:
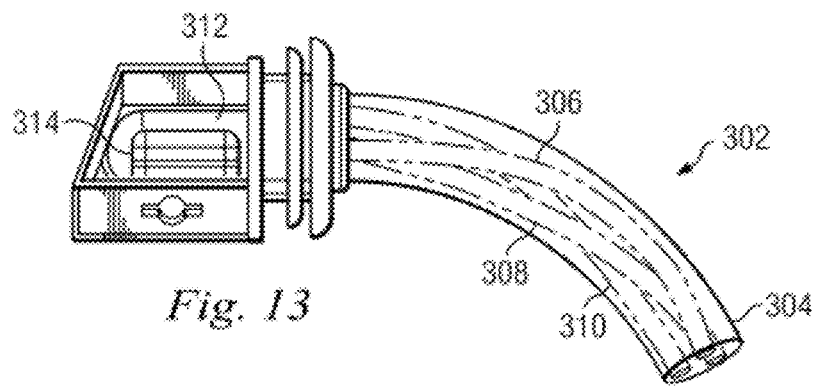
FIG. 13 is a partial cutaway perspective view of a simulated umbilicus of the patient simulator of FIG. 9.

Referring now to FIGS. 12 and 13, shown therein is a newborn simulator 300 incorporating a simulated umbilicus 302 according to one aspect of the present disclosure. In one embodiment, the newborn simulator 300 is substantially the size of an average sized neonate of 28 weeks gestational age. In another embodiment, the newborn simulator 300 is substantially the size of an average sized neonate of 40 weeks gestational age. Generally, the newborn simulator 300 exhibits many physiological characteristics, including heart rate, pulse, oxygenation, and a variety of body sounds that can be detected using the conventional instrumentation. In that regard, the umbilicus 302 is configured to be in sync with the other portions of the newborn simulator. For example, the umbilicus 302 is configured to simulate an umbilical pulse that is timed to coincide with the heart beat of the newborn simulator 300.

Referring more particularly to FIG. 13, the umbilicus 302 includes a flexible elongated body or tubing 304 having three passageways 306, 308, and 310 extending along its length. The three passageways 306, 308, and 310 simulate a vein and a pair of arteries, respectively. In that regard, in some instances the three passageways 306, 308, and 310 may be cannulated using standard techniques for cannulating a vein or artery of a natural umbilicus. In some instances, the three passageways 306, 308, and 310 are generally equally spaced about the circumference of the tubing 304, as shown at the end of the tubing 304 in FIG. 13. However, the three passageways 306, 308, and 310 may be spiraled within and along the length of the tubing. In that regard, the three passageways 306, 308, and 310 are oriented to simulate the natural configuration of the vein and arteries of a natural umbilicus in some embodiments.

The three passageways 306, 308, and 310 are in fluid communication with a reservoir 312. In that regard, the reservoir 312 contains a fluid. In some instances, the fluid within the reservoir 312 simulates blood of the umbilicus 302. Adjacent to the reservoir is an actuator 314. The actuator 314 is configured to control a flow of the fluid between the reservoir 312 and the three passageways 306, 308, and 310 to simulate an umbilical pulse. Generally, the actuator 314 may be any suitable mechanism for controlling the flow of fluid to simulate the umbilical pulse, include mechanical, pneumatic, electro-mechanical, and/or combinations thereof. In one embodiment, the actuator includes an air valve and an associated bellow, where actuation of the air valve selectively inflates and deflates the bellow to control the flow of the fluid between the reservoir 312 and the three passageways 306, 308, and 310. In that regard, inflation of the bellow causes the bellow to compress at least a portion of the reservoir 312 and urges fluid out the reservoir and into the passageways 306, 308, and 310, while deflation of the bellow allows the reservoir to expand back to its original state and allows the fluid to flow back into the reservoir.

In some instances, the umbilicus 302 is configured to train medical personnel on a proper technique for cutting a natural umbilicus. In that regard, in some instances the umbilicus 302 is configured for use with an umbilical clamp such that when the umbilical clamp is properly applied to the flexible elongated body the umbilical clamp prevents the fluid from the reservoir flowing distally beyond the umbilical clamp. Further, in some instances the umbilicus 302 is formed of a material that simulates a natural umbilicus in terms of the force needed to cut the material.

In some instances, the umbilicus 302 is a disposable component of the newborn simulator 300. In that regard, the newborn simulator 300 includes a recess or opening for receiving the umbilicus 302. Accordingly, it is understood that one umbilicus is readily replaceable with another umbilicus when necessary. Alternatively, the tubing 304 of umbilicus may be a disposable component such that the tubing is replaceable and the reservoir is refillable, if necessary, but the remaining parts of the umbilicus remain with the newborn simulator 300.

Figure 14:
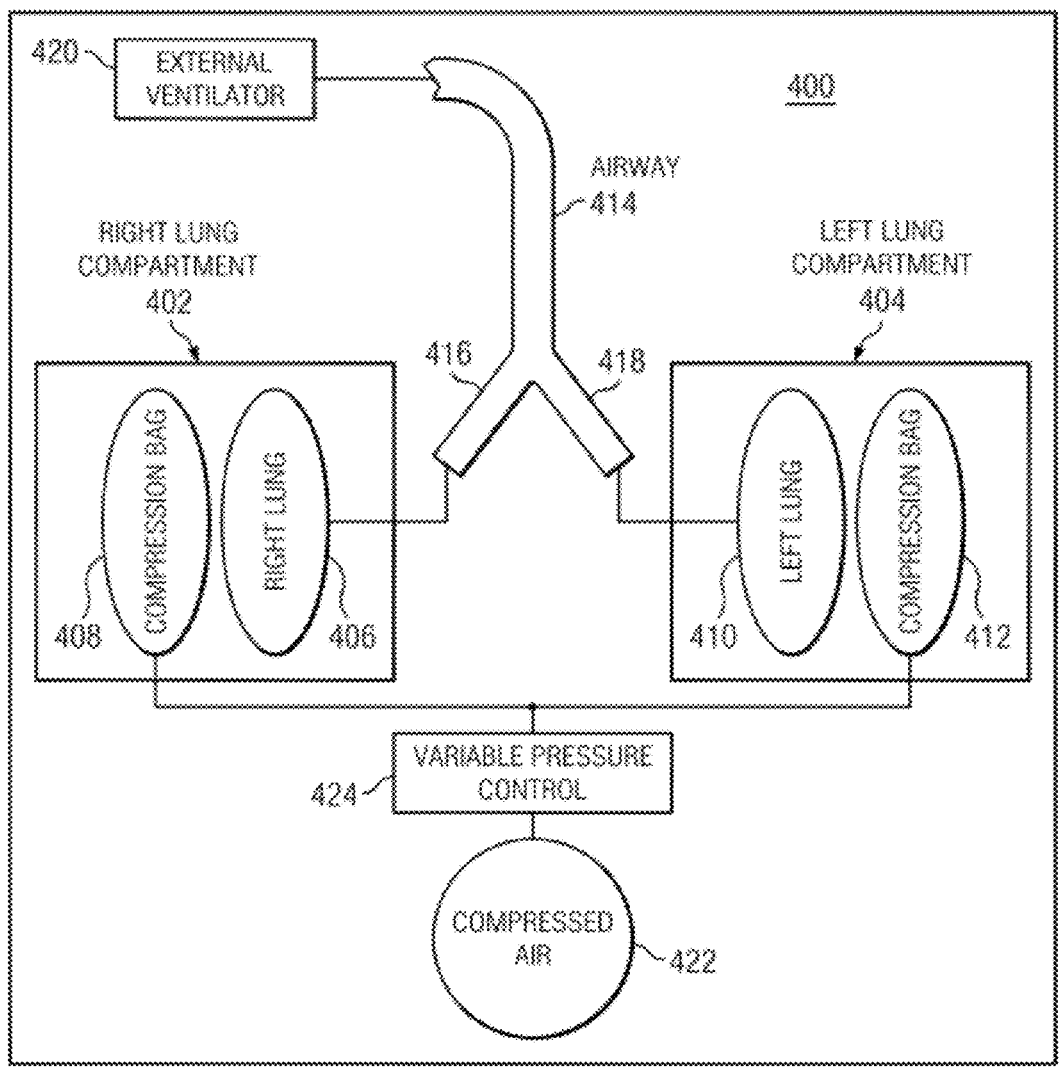
FIG. 14 is a diagrammatic schematic view of a lung compliance system according to another aspect of the present disclosure.

Referring now to FIG. 14, shown therein is a diagrammatic schematic view of a lung compliance system 400 according to another aspect of the present disclosure. The lung compliance system 400 is configured to simulate natural lung mechanics. In particular, the lung compliance system 400 is configured to simulate the natural lung mechanics associated with connecting natural lungs to external ventilators. As a general matter, lung compliance is a measure of air volume change relative to applied pressure change. Lungs that stretch too much (too flexible) are said to be high compliance lungs, whereas lungs that stretch too little (too stiff) are said to be low compliance lungs. The lung compliance system 400 facilitates simulation of normal, high, and low compliance lungs. In that regard, the lung compliance system 400 increases and decreases the volume capacity of one or more simulated lungs to replicate natural lung compliance.

As shown, the lung compliance system 400 includes a right lung compartment 402 and a left lung compartment 404. The right lung compartment 402 contains a lung 406 and a compression bag 408, while the left lung compartment 404 contains a lung 410 and a compression bag 412. Each of the lung compartments 402, 404 define a confined area that contains lungs 406, 410 and compression bags 408, 412, respectively. In some instances, the lung compartments 402, 404 are formed of a fabric, plastic, polymer, or other material having minimal stretchability and/or a predetermined maximum volume such that the lung compartments 402, 404 do not expand or stretch beyond the maximum volume, even during inflation and deflation of the lungs 406, 410 and compression bags 408, 412 as discussed below. The lungs 406, 410 and compression bags 408, 412 are formed of latex or other flexible material that allows expansion and contraction of the volume of the lungs and compression bags.

The lungs 406, 410 are connected to an airway 414. In particular, the right lung 406 is connected to the airway 414 through a branch 416, while the left lung 410 is connected to the airway 414 through a branch 418. The airway 414 leads to an external orifice that is communication with an external ventilator 420. In some instances, the airway 414 leads to an external orifice of a patient simulator, such as a simulated mouth and/or nose. In such instances, the interface or connection between the external ventilator 420 and the airway 414 via the external orifice(s) mimics the interface or connection between the external ventilator and a natural patient. In that regard, the external ventilator 420 is generally representative of any external ventilator that is utilized in medical settings. As a general matter the lung compliance system 400 is suitable for use with all types of commercially available ventilators (including bag valve masks, as well as computerized or automated ventilators). Accordingly, the lung compliance system 400 is suitable to train medical personnel on the proper manner of utilizing the particular ventilator(s) used in the hospital or other medical setting in which the medical personnel will be working. Generally, the connections between the external ventilator 420, the airway 414, the branches 416, 418, and the lungs 406, 410 allow the transfer of air between the external ventilator 420 and the lungs 406, 410 to simulate assisted breathing.

The compression bags 408, 412, on the other hand, are connected to a compressed air source 422 via a variable pressure control valve 424. In that regard, the variable pressure control valve 424 controls the air pressure within the compression bags 408, 412 and, thereby, the corresponding volumes of the bags. In that regard, as the compression bags 408, 412 are expanded the available room within the compartments 402, 404 for the lungs 406, 410 to expand is correspondingly reduced. Accordingly, lung compliance is varied by increasing/decreasing the air pressure inside the compression bags 408, 412 to provide the desired amount of available volume within the compartments 402, 404 for the lungs 406, 410 to expand into. In that regard, as the pressure inside the bags 408, 412 is increased, the volume of the compression bags increases, which decreases the available volume for the lungs 406, 410, which in turn simulates decreased lung compliance. On the other hand, as the pressure inside the bags 408, 412 is decreased, the volume of the compression bags decreases, which increases the available volume for the lungs 406, 410, which in turn simulates increased lung compliance. Accordingly, by adjusting the pressure and corresponding volume of the compression bags, the size of lungs is similarly adjusted to simulate lung compliance from High to Normal to Low.

While the lung compliance system 400 is shown as having right and left lung compartments, in other embodiments the system includes only a single lung compartment. Further, while the compression bags 408, 412 are shown as being connected to a single control valve 424, it is understood that the pressure within each of the compression bags 408, 412 is controlled separately in some instances. In some such instances, the system includes a pair of control valves, each associated with one of the compression bags. Alternatively, the single control valve 424 may have two or more outputs that are individually controlled to allow separate control of the pressures within the compressions bags 408, 412. Further still, in some embodiments the compression bags 408, 412 are filled with a liquid, instead of air or other gas. In other embodiments, the compression bags 408, 412 are replaced with a movable member that selectively increases/decreases the available volume within lung compartments 402, 404 for the lungs 406, 410. For example, in one embodiment each of the lung compartments 402, 404 includes a movable wall that is connected to a motor, pneumatic valve, or other actuator that controls the position of the wall within the lung compartment. Movement of the wall selectively increases or decreases the volume within the lung compartment.

Referring now to FIG. 15, shown therein is a diagrammatic schematic view of a portion of an epidural and lumbar puncture task trainer 500 according to one embodiment of the present disclosure. In that regard, the task trainer 500 includes a back plate or simulated torso 502. In the present embodiment, the back plate 502 is only a portion of a simulated torso, which allows the task trainer 500 to be highly portable due to its reduced size. In other embodiments, however, the back plate 502 is part of a full-bodied manikin. Generally, the back plate 502 includes critical anatomical landmarks for epidural and lumbar puncture procedure, including the location of the iliac crests. The back plate 502 of the task trainer 500 includes a recess or opening 504 sized and shaped to receive an epidural/lumbar puncture insert. In that regard, the epidural/lumbar puncture insert is similar to insert 220 described above in some instances. The opening 504 is positioned in a simulated lumbar region of the spine. In the illustrated embodiment the opening 504 has a generally rectangular profile. However, it is understood that the opening 504 may take any shape, including geometrical and irregular shapes. The opening 504 includes a depression 506 that is bounded by a surface 508 that is recessed with respect to the outer surface of the back plate 502. In some instances, the depression 506 has provisions (e.g., structure, recess, connectors, etc.) to orient a fluid-filled tubing that forms a simulated dura mater and cerebrospinal fluid, as discussed below. In some instances, the surface 508 is a skin-deep recess. That is, the surface 508 is bounded by a rim or edge of the back plate 502 that is generally the thickness of the simulated skin of the back plate. In that regard, the epidural/lumbar puncture insert may include a simulated skin layer that includes an overhang or lip that sized and shaped to mate with the surface 508 such that when the epidural insert is received within the recess 504, the skin layer of the epidural/lumbar puncture insert and the skin layer of the back plate 502 are substantially aligned to form a continuous skin layer. In some instances, a structure (e.g., a fabric tab) is attached to the top side of the insert to aid in removal of the epidural/lumbar puncture insert from the back plate 502.

In additional to the back plate 502 and the epidural/lumbar puncture insert, the task trainer 500 includes a fluid supply system 510. In that regard, the fluid supply system 510 allows the task trainer 500 to be used as both a lumbar puncture trainer and an epidural trainer. The fluid supply system 500 includes a pressure source or fluid supply 512 (e.g., a syringe assembly, an IV Bag assembly, or pump) and tubing 514 in communication with the fluid supply 512 to simulate the dura mater and subarachnoid space. In that regard, the tubing 514 is connected to the fluid supply 512 via tubing 516, 518. In some instances, tubing 516, 518 are integrally formed with one another and/or tubing 514. In other instances, one or more of tubing 514, 516, and 518 are separate components that are connected to one another. The fluid supply system also includes additional tubing (not shown) to facilitate drainage/venting tube. In that regard, the arrangement of the tubing and connectors of the fluid supply system 500 allow the system to either be closed or open. In that regard, an open system is typically needed when filling or draining the system of its simulated cerebrospinal fluid. During a procedure, a closed system is preferred so that the fluid loop can be pressurized to a desired pressure (simulating either normal or abnormal CSF pressure). Further, sometimes it is desirable necessary to measure the Cerebrospinal Opening Pressure at the beginning of a Lumbar Puncture Procedure. Accordingly, a closed loop that can be pressurized to a desired level allows training of the measurement techniques. By having the flexibility to change this pressure, a training session can include analysis of normal versus abnormal values of pressures.

In that regard, in some embodiments the task trainer 500 also includes pressure measurement circuitry that in communication with the fluid supply system 510 in order to accurately monitor and/or set the pressure within at least the tubing 514. In one embodiment, a pressure transducer is incorporated within the fluid loop and a display is provided to enable pressure readout. The display can include either an analog (e.g., dial) or digital (e.g., LED) readout to show the pressure level. In some instances, the pressure display is embedded in the side wall or other surface of the back plate 502. Further, in some instance the pressure measurement circuitry allows the user to set the desired pressure and, in turn, controls the fluid supply system to achieve the set pressure. The fluid supply system and pressure measurement circuitry are battery powered in some instances, allowing the system to be compact and portable. In other instances, the task trainer 500 utilizes line power. In some instances, a supporting stand is provided to mount the task trainer 500 on. In that regard, the stand allows the trainer to be used in either a sitting position or a left lateral decubitus position.

FIG. 16 is a diagrammatic schematic view of an epidural and lumbar puncture task trainer 520. Task trainer 520 is similar in many respects to task trainer 500, but the fluid supply system is contained within a base 522 of the task trainer 520. In some instances, the base 522 includes openings, compartments, and/or other structure sized and shaped to contain all of the necessary tubing and electronics of the task trainer. As shown, the base 522 of the task trainer 520 includes a recess or opening 524 that is sized and shaped to receive the epidural/lumbar puncture insert. The opening 524 includes a depression 526 that is bounded by a surface 528 that is recessed with respect to the outer surface of the base 502. The task trainer 520 also includes a fluid supply system that allows the task trainer 500 to be used as both a lumbar puncture trainer and an epidural trainer. The fluid supply system 500 includes a pressure source or fluid supply 530 (e.g., a syringe assembly, an IV Bag assembly, or pump) and tubing 532 in communication with the fluid supply to simulate the dura mater and subarachnoid space. As shown, the entire fluid supply system 500 is contained within the profile of the base 522.

Figure 18:
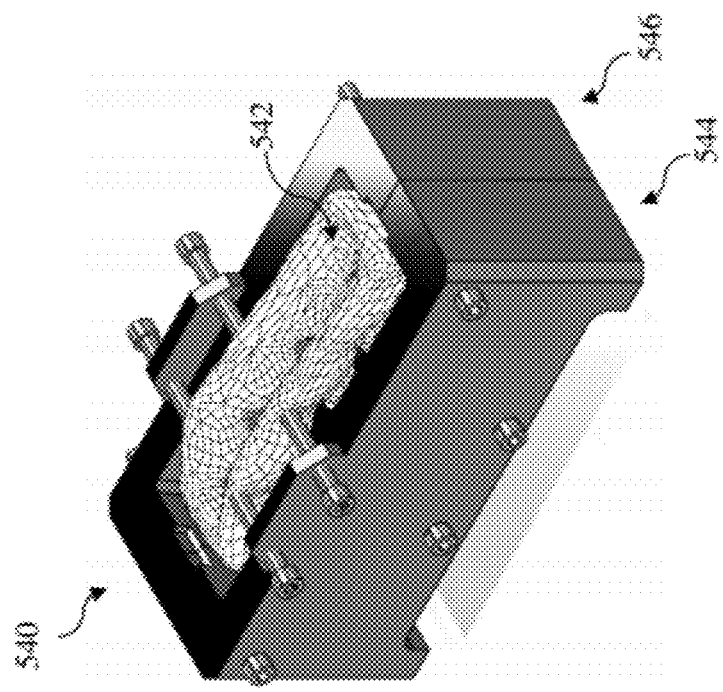
FIG. 18 is a perspective view of the molding system of FIG. 17 in an assembled state.
Figure 17:
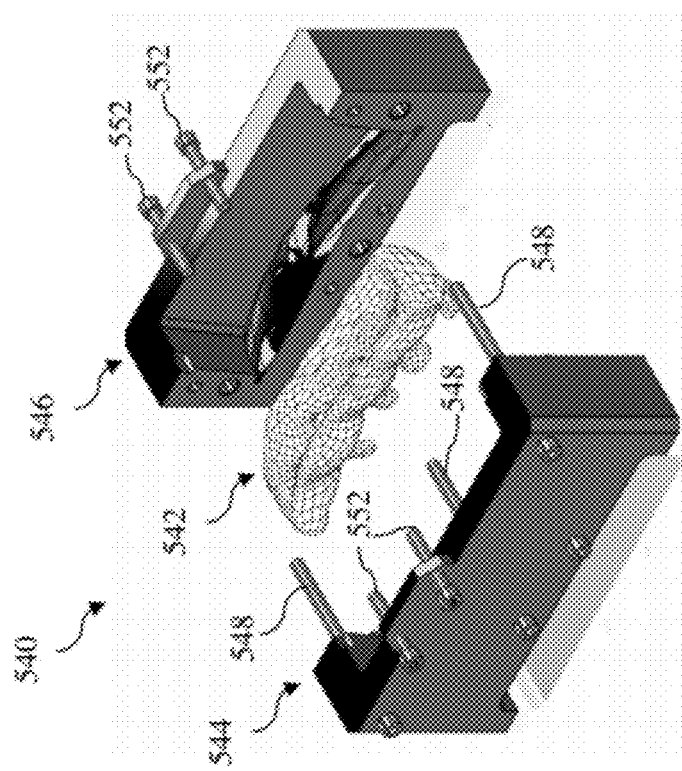
FIG. 17 is a perspective view of a molding system in a separated state according to one embodiment of the present disclosure.

Referring now to FIGS. 17 and 18, shown therein is a molding system 540 according to one embodiment of the present disclosure. More specifically, FIG. 17 is a perspective view of the molding system 540 in a separated state, while FIG. 18 is a perspective view of the epidural molding system in an assembled state. In that regard, the molding system 540 is particular suited for forming epidural/lumbar puncture inserts of the present disclosure. Both the lumbar vertebrae and the epidural/lumbar puncture insert assembly are manufactured in split molds. The lumbar vertebrae are manufactured in a split mold glove mold. Due to the complexity of the geometry, it is necessary to mold the rigid vertebrae within a flexible glove mold that is split into two halves for ease of de-molding. An anatomical model forms the basis of the lumbar vertebrae, and a two-part glove mold is cast around the anatomical model. In some instances, the glove mold is cast within a rectangular box. As a result, the external geometry of the glove mold is rectangular, and the internal cavity follows the contours of the anatomical model. In some instances, the glove mold is manufactured from a platinum-cured silicone thermoset with a shore hardness between about 10 A and about 30 A. In one embodiment, the glove mold is formed of a silicone thermoset with a shore hardness of 10 A (such as Dragon Skin® 10 Medium, Smooth-On, Inc., Easton, Pa.).

Referring more specifically to FIG. 17, molding system 540 is shown with the lumbar vertebrae 542 positioned between split mold portion 544 and split mold portion 546. In that regard, the split mold portions 544, 546 that define the split mold for forming the epidural/lumbar puncture insert assembly have complex geometries that work best when manufactured using a process such as rapid prototyping and/or direct metal laser sintering (DMLS). In the case of rapid prototyping, an ABS mold is produced on a 3D printer. If DMLS is utilized, an aluminum mold is produced. The split mold portions 544, 546 include a plurality of locating projections that are utilized to couple the split mold portions 544 and 546 to one another and to secure the lumbar vertebrae 542 in place with respect to the split mold portions 544, 546. In the illustrated embodiment, projections 548 extending from split mold portion 544 will engage corresponding recesses in split mold portion 546. Similarly, projections 552 extending from each of the split mold portions 544, 546 will engage corresponding recesses or depressions in the lumbar vertebrae 542. In that regard, the locating projections 548 and/or 552 are screws or other engaging structures in some instances. Referring to FIG. 18, the split mold portions 544, 546 are shown assembled with the lumbar vertebrae 542. The split mold arrangement allows de-molding of the assembly.

As discussed above with insert 220, the epidural/lumbar puncture inserts of the present disclosure consist of a skin layer, a subcutaneous layer, a simulated ligamentum flavum, and lumbar vertebrae (e.g., L2, L3, L4, and L5) whose properties are optimized to provide realistic tactile feedback for the injection process. In some embodiments, the skin layer is manufactured from a platinum-cured silicone thermoset with a shore hardness between about 00-30 and about 30 A. In one embodiment, the skin layer is formed of a silicone thermoset with a shore hardness of 10 A (e.g., Dragon Skin 10 Medium, Smooth-On, Inc., Easton, Pa.) including pigments to provide a color match to the skin tone of the back plate. In some embodiments, the subcutaneous layer is manufactured from a blend of silicone foam, silicone thermoset, and silicone oil. In some embodiments, the silicone foam (e.g., Soma Foama, Smooth-On, Inc., Easton, Pa.) ranges from about 10% to about 40% of the total weight, the silicone thermoset has a shore hardness of 00-10 (e.g., Silicone 99-255, Smooth-On, Inc., Easton, Pa.) and ranges from about 15% to about 65% of the total weight, and the silicone oil (e.g., TC-5005 C, BJB Enterprises, Tustin, Calif. or F-100, SILPAK, Inc., Pomona, Calif.) ranges from about 10% to about 70% of the total weight. In one particular embodiment, the subcutaneous layer is formed with the percentage of foam at approximately 15%, the percentage of silicone thermoset at approximately 17%, and the percentage of oil (TC-5005 C, BJB Enterprises, Tustin, Calif.) at approximately 68%. The present inventors have found that this blend creates a layer that accurately represents the hardness and consistency of the subcutaneous layer. In some embodiments, the simulated ligamentum flavum is manufactured from a platinum-cured silicone thermoset with a shore hardness between about 10 A and about 50 A. In one embodiment, the ligamentum flavum layer is formed of a silicone thermoset with a shore hardness of 20 A (e.g., Dragon Skin® 20, Smooth-On, Inc., Easton, Pa.). The lumbar vertebrae are made of a hard material to realistically represent bone. In one embodiment, the vertebrae are formed of a castable urethane plastic with a shore hardness of 70 D (e.g., Smooth-Cast® 305, Smooth-On, Inc., Easton, Pa.). Using a castable urethane plastic can provide advantages in forming the vertebrae in that it has a low viscosity (so mold-filling is easy), the final cured part is colored similar to bone without the addition of pigments, and it has a short de-mold time (approximately 30 minute) at room temperature.

The properties of these tissue layers of the epidural/lumbar puncture insert are critical to the tactile feedback during a needle puncture. Each of the material layers differs in terms of hardness and thickness. The epidural/lumbar puncture insert aims to replicate the feedback when puncturing through the skin, subcutaneous, and the ligamentum flavum, so inclusion of the fascia and muscle are not critical. However, in other embodiments, fascia and muscle layers are included for completeness.

Example 1

Manufacture of Epidural/Lumbar Puncture Insert with Light Skin Tone

The following is an example of one method for manufacturing an epidural and lumbar puncture insert in accordance with the present disclosure. It is understood that this is provided for illustration and explanation and should not be considered limiting as to other alternative techniques of creating epidural and/or lumbar puncture inserts in accordance with the present disclosure.

1. Manufacture Skin Layer:
   a. Clean and assemble the mold, then apply mold release.
   b. Prepare the Skin Mixture (Material: Dragon Skin 10 Medium)
      Measure 90 g Part B, add 0.4 g of Silc Pig Fleshtone, add 1 drop (approximately 0.05 mL) of Fuse FX Rosy Skin, add 2 Drops (approximately 0.1 mL) of FuseFX Light Skin, mix until a uniform color
      Add 90 g of Part A
   c. Mix and Vacuum until all bubbles are removed
   d. Pour the Skin Mixture into the mold (start pouring at the lowest point). Pour entire contents into the mold.
   e. Allow to cure for 45 minutes at 66° C.
2. Manufacture Lumbar Vertebrae:
   a. Clean and assemble the mold
   b. Prepare the Lumbar Mixture (Material: Smooth-Cast® 305)
      Measure 40 g of Part A, and add 40 g of Part B
   c. Mix until turns from white to clear
   d. Pour into silicone mold. When half full, tap silicone mold to release trapped bubbles then fill to top.
   e. Completely fill the mold (2 mm before top surface)
   f. Place in well ventilated location, such as a Fume Hood, to cure
   g. Allow to cure for 30 minutes at room temperature (73° F.)
3. Manufacture Fat Layer:
   a. Prepare the Fat Mixture (Materials: Soma Foama, Silicone 99-255, & TC 5005C)
      Measure 17.5 g of Silicone 99-255 Part A, add 21 g Soma Foama Part A, add 140 g TC 5005C, mix until uniformly distributed.
      Add 17.5 g Silicone 99-255 Part B, add 10.5 g Soma Foama Part B
      Mix until bubble formation and reaction begins, and mixture begins to thicken (approximately 8 minutes at 73° F.).
   b. Transfer the mixture to the mold, and continue to mix the material until it starts to set.
   c. Position the vertebral segment within the locating screws before the foam mixture has completely set d. Allow to cure for 2 hours at room temperature
Manufacture Ligamentum Flavum:
  a. Prepare the Ligament mixture (Material: Dragon Skin® 20):
    Measure 60 g Part B, add 2 drops (approximately 0.2 mL) of Silc Pig Blood, mix until a uniform color
    Add 60 g Part A
  b. Mix and Vacuum until all bubbles are removed
  c. Pour the mixture into the mold making sure to cover the simulated fat layer at the opening of each vertebral foramen.
  d. Allow to cure for 4 hours at room temperature (73° F.)

Figure 19:
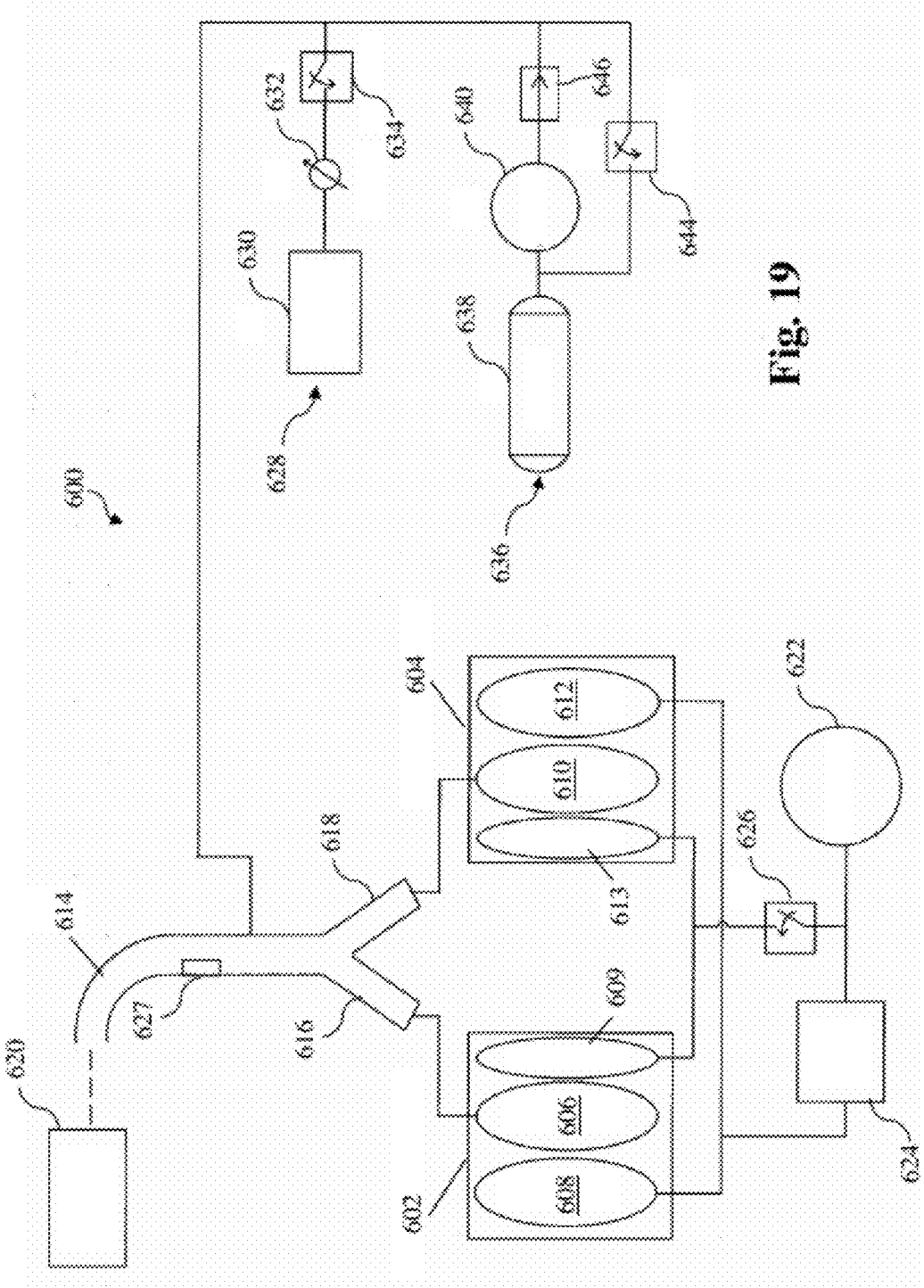
FIG. 19 is a diagrammatic schematic view of a lung compliance system according to another embodiment of the present disclosure.

Referring now to FIG. 19, shown therein is a diagrammatic schematic view of a lung compliance system 600 according to another embodiment of the present disclosure. The lung compliance system 600 is configured to simulate natural lung mechanics. In particular, the lung compliance system 600 is configured to simulate the natural lung mechanics associated with connecting natural lungs to external ventilators, including positive end-expiratory pressure (PEEP) and assisted-control ventilation. In that regard, PEEP is used to maintain a patient's airway pressure above atmospheric pressure by exerting pressure that opposes passive emptying of the lungs. PEEP is often used for patients that have a decrease in functional residual capacity of the lungs, which is the volume of gas that remains in the lung at the end of normal expiration. Functional residual capacity is determined primarily by the elastic characteristics of the lungs and chest wall, which is related to lung compliance. As a general matter, lung compliance is a measure of air volume change relative to applied pressure change. Lungs that stretch too much (too flexible) are said to be high compliance lungs, whereas lungs that stretch too little (too stiff) are said to be low compliance lungs. The lung compliance system 600 facilitates simulation of normal, high, and low compliance lungs. In that regard, the lung compliance system 600 increases and decreases the volume capacity of one or more simulated lungs to replicate natural lung compliance.

As shown, the lung compliance system 600 includes a right lung compartment 602 and a left lung compartment 604. The right lung compartment 602 contains a lung 606, a compression bag 608, and a squeezing bag 609, while the left lung compartment 604 contains a lung 610, a compression bag 612, and a squeezing bag 613. Each of the lung compartments 602, 604 define a confined area that contains the lungs 606, 610, compression bags 408, 412, and squeezing bags 609, 613, respectively. In some instances, the lung compartments 602, 604 are formed of a fabric, plastic, polymer, or other material having minimal elasticity and/or a predetermined maximum volume such that the lung compartments 602, 604 do not expand or stretch beyond the maximum volume, even during inflation and deflation of the lungs 606, 610, compression bags 608, 612, and squeezing bags 609, 613 as discussed below. The lungs 606, 610, compression bags 608, 612, and squeezing bags 609, 613 are formed of latex or other flexible material that allows expansion and contraction of the volume of the lungs, compression bags, and squeezing bags.

The lungs 606, 610 are connected to an airway 614. In particular, the right lung 606 is connected to the airway 614 through a branch 616, while the left lung 610 is connected to the airway 614 through a branch 618. The airway 614 leads to an external orifice that is communication with an external ventilator 620. In some instances, the airway 614 leads to an external orifice of a patient simulator, such as a simulated mouth and/or nose. In such instances, the interface or connection between the external ventilator 620 and the airway 614 via the external orifice(s) mimics the interface or connection between the external ventilator and a natural patient. In that regard, the external ventilator 620 is generally representative of any external ventilator that is utilized in medical settings. As a general matter the lung compliance system 600 is suitable for use with all types of commercially available ventilators (including bag valve masks, as well as computerized or automated ventilators). Accordingly, the lung compliance system 600 is suitable to train medical personnel on the proper manner of utilizing the particular ventilator(s) used in the hospital or other medical setting in which the medical personnel will be working. Generally, the connections between the external ventilator 620, the airway 614, the branches 616, 618, and the lungs 606, 610 allow the transfer of air between the external ventilator 620 and the lungs 606, 610 to simulate assisted breathing.

The compression bags 608, 612 and the squeezing bags 609, 613 are connected to a compressed air source 622. The compression bags 608, 612 are connected to the air source 622 via a variable pressure control valve 624. In that regard, the variable pressure control valve 624 controls the air pressure within the compression bags 608, 612 and, thereby, the corresponding volumes of the compression bags. In that regard, as the compression bags 608, 612 are expanded the available room within the compartments 602, 604 for the lungs 606, 610 is correspondingly reduced. Accordingly, lung compliance is varied by increasing/decreasing the air pressure inside the compression bags 608, 612 to provide the desired amount of available volume within the compartments 602, 604 for the lungs 606, 610 to expand into. In that regard, as the pressure inside the bags 608, 612 is increased, the volume of the compression bags increases, which decreases the available volume for the lungs 606, 610, which in turn simulates decreased lung compliance. On the other hand, as the pressure inside the compression bags 608, 612 is decreased, the volume of the compression bags decreases, which increases the available volume for the lungs 606, 610, which in turn simulates increased lung compliance. Accordingly, by adjusting the pressure and corresponding volume of the compression bags 608, 612, the size of lungs 606, 610 is similarly adjusted to simulate lung compliance from High to Normal to Low.

The squeezing bags 609, 613 are connected to the air source 622 via a valve 626. Valve 626 controls the flow of air to the squeezing bags 609, 613. In that regard, the inflation of the squeezing bags 609, 613 is synchronized with the respiratory cycle of the simulator. More specifically, the squeezing bags 609, 613 are inflated with expiration and deflated with inspiration. In some instances a pressure sensor 627 in communication with airway 614 is utilized to monitor expiration and inspiration pattern of the ventilator. In that regard, an increase in pressure is associated with inspiration, while a decrease in pressure is associated with expiration. Inflation of the squeezing bags 609, 613 reduces (along with the compression bags 608, 612) the available volume for the lungs 606, 610 within the lung compartments 602, 604, which assists in forcing air out of the lungs 606, 610 (simulating exhaling). On the other hand, deflation of the squeezing bags 609, 613 increases the available volume for the lungs 606, 610 within the lung compartments 602, 604, which assists in allowing air into the lungs 606, 610 (simulating inhaling). When inflated the squeezing bags 609, 613 along with the compression bags 608, 612 define the available volume remaining in the compartments for the lungs 606, 610. Accordingly, in some instances inflation of the squeezing bags 609, 613 and compression bags 608, 612 are controlled in a manner that defines the functional residual capacity of the lungs 606, 610. This allows the lung system 600 to be utilized with positive end-expiratory pressure (PEEP) aspects of the external ventilator 620.

The lung compliance system 600 is also configured to simulate $CO_2$ exhalation while keeping the simulator mobile. In that regard, previous systems have relied upon external $CO_2$ sources such as canisters (too large to fit inside a patient simulator) or lines (located a fixed location) that limit the mobility of the simulator. In contrast, the lung compliance system 600 includes a $CO_2$ system 628 that is easily placed within a patient simulator. In that regard, the $CO_2$ system 628 includes a miniature $CO_2$ canister 630, a pressure regulator 632, and a valve 634 that are in communication with the airway 614. In some embodiments, the $CO_2$ canister 630 holds between about 2 g to about 250 g of $CO_2$. In that regard, in some instances the $CO_2$ canister 630 is a commercially available $CO_2$ canister similar to those utilized for numerous recreational purposes (e.g., refilling bicycle tires, paintball guns, etc.). The pressure regulator 632 reduces the pressure from the $CO_2$ canister 630. In some instances, the pressure regulator 632 reduces the pressure to approximately 3 psi. The valve 634 opens in coordination with the respiratory cycle of the simulator such that a small amount of $CO_2$ is released with each exhale of the simulator.

The lung compliance system 600 is also configured to work with assist-controlled aspects of the external ventilator 620. In that regard, the lung compliance system is able to trigger the ventilator to cause the ventilator to assist the simulator in breathing. Assist-controlled ventilation is used on patients that are trying to breathe on their own but are still too weak to breathe on their own. Accordingly, the ventilator 620 is utilized to help the patient breath when it senses the patient's natural breathing is insufficient. With respect to lung compliance system 600, an air flow system 636 is utilized to simulate the patient's natural breathing in a manner that can be used with the assist-controlled aspects of a ventilator. In that regard, the air flow system includes a vacuum tank 638, a compressor, 640, a vacuum valve 644, and a check valve 646. In use, the compressor 640 extracts air from the vacuum tank 638, which is passed through the check valve 646 and into airway 614. In that regard, check valve 646 is a one-way valve such that air can only go from compressor 640 out towards airway 614. Coordinated with the respiration rate of the simulator, the vacuum valve 644 connects the airway 614 with the vacuum tank 638. By connecting the airway 614 to the vacuum tank 638, air is removed from the airway 614. This is utilized to trigger the assist function of the ventilator 620. In that regard, many ventilators monitor the amount of air into and out of the patient. If it is determined that the amounts are not equal, the ventilator will sound an alarm. Accordingly, the air flow system 636 is a closed loop system to ensure that the amount of air coming into the simulator is the same as the amount of air going out from the simulator. In that regard, air extracted from the vacuum tank 638 goes into the airways of the simulator (including branches 616, 618 and lungs 606, 610, in some instances), and when the vacuum tank 638 is connected with the airways via the vacuum valve 644, air from the airways fill the vacuum tank.

While the lung compliance system 600 is shown as having right and left lung compartments, in other embodiments the system includes only a single lung compartment. Further, while the compression bags 608, 612 are shown as being connected to a single control valve 624, it is understood that the pressure within each of the compression bags 608, 612 is controlled separately in some instances. In some such instances, the system includes a pair of control valves, each associated with one of the compression bags. Alternatively, the single control valve 624 may have two or more outputs that are individually controlled to allow separate control of the pressures within the compressions bags 608, 612. Similarly, the squeezing bags 609, 613 may be independently controlled using one or more valves. Further still, in some embodiments the compression bags 608, 612 and/or the squeezing bags 609, 613 are filled with a liquid, instead of air or other gas. In other embodiments, the compression bags 608, 612 and/or the squeezing bags 609, 613 are replaced with a movable member that selectively increases/decreases the available volume within lung compartments 602, 604 for the lungs 606, 610. For example, in one embodiment each of the lung compartments 602, 604 includes one or more movable walls, where each wall is connected to a motor, pneumatic valve, or other actuator that controls the position of the wall within the lung compartment. Movement of the wall selectively increases or decreases the volume within the lung compartment and/or assists in lung deflation/inflation.

Although illustrative embodiments have been shown and described, a wide range of modification, change, and substitution is contemplated in the foregoing disclosure and in some instances, some features of the present disclosure may be employed without a corresponding use of the other features. It is understood that such variations may be made in the foregoing without departing from the scope of the embodiment. Accordingly, it is appropriate that the appended claims be construed broadly and in a manner consistent with the scope of the present disclosure.

What is claimed is:

1. A system for teaching patient care, the system comprising:
    a lung compliance simulation system including:
        a lung compartment; and
        a simulated lung positioned within the lung compartment, the simulated lung being inflatable and deflatable;
        wherein the lung compartment defines an available volume for the simulated lung to expand into and wherein the available volume for the simulated lung to expand into is adjustable to control a compliance of the simulated lung;
    wherein the lung compliance simulation system further includes a compression bag positioned within the lung compartment;
    wherein the compression bag is inflatable and deflatable to adjust the available volume for the simulated lung to expand into.

2. The system of claim 1, wherein the compression bag is in fluid communication with a source of pressurized air.

3. The system of claim 2, wherein the lung compliance system further includes a control valve for controlling an air pressure within the compression bag.

4. The system of claim 3, wherein the control valve is positioned between the compression bag and the source of pressurized air.

5. The system of claim 1, wherein the lung compliance system further comprises a squeezing bag positioned within the lung compartment.

6. The system of claim 5, wherein the squeezing bag is configured to inflate with exhalation and deflate with inhalation.

7. The system of claim 6, wherein the squeezing bag is in fluid communication with a source of pressurized air and wherein a valve is positioned between the squeezing bag and the source of pressurized air, the valve configured to control flow of air into the squeezing bag in coordination with exhalation and inhalation.

8. The system of claim 1, wherein the lung compliance system is positioned within a patient simulator.

9. The system of claim 8, wherein the patient simulator includes a simulated head having at least one of a simulated mouth and a simulated nose.

10. The system of claim 9, wherein the patient simulator further includes a simulated airway connecting the simulated lung to at least one of the simulated mouth and the simulated nose.

11. The system of claim 10, wherein the patient simulator and the lung compliance system are configured to interface with a ventilator.

12. The system of claim 11, wherein the ventilator is a bag valve mask.

13. The system of claim 11, wherein the lung compliance system is configured to trigger an assist-control function of the ventilator.

14. The system of claim 13, wherein the lung compliance system includes a vacuum tank and a vacuum valve coordinated with a simulated breathing pattern of the patient simulator to trigger the assist-control function of the ventilator.

15. The system of claim 8, wherein the lung compliance system is configured to simulate exhaling of $CO_2$.

16. The system of claim 15, wherein the lung compliance system includes a $CO_2$ canister that is fully received within a portion of the patient simulator, a pressure regulator in fluid communication with the $CO_2$ canister, and a valve in communication with the pressure regulator, the valve coordinated with a simulated breathing pattern of the patient simulator to simulate the exhaling of $CO_2$.

17. An apparatus comprising:
a lung compartment defining a maximum volume;
a first bag positioned within the lung compartment, the first bag being inflatable and deflatable to simulate functioning of a natural lung;
a second bag positioned within the lung compartment adjacent to the first bag, the second bag being inflatable and deflatable to occupy varying amounts of the maximum volume in order to control a simulated lung compliance of the first bag.

18. The apparatus of claim 17, wherein the first bag is formed of latex.

19. The apparatus of claim 18, wherein the second bag is formed of latex.

20. The apparatus of claim 19, wherein the lung compartment is formed of a material that is less flexible than latex.

21. The apparatus of claim 17, wherein increasing the amount of the maximum volume occupied by the second bag decreases the simulated lung compliance of the first bag.

22. The apparatus of claim 21, wherein decreasing the amount of the maximum volume occupied by the second bag increases the simulated lung compliance of the first bag.

23. The apparatus of claim 22, wherein a control valve in communication with a source of pressurized air and the second bag controls a volume of the second bag.

24. A patient simulator comprising:
a right lung compartment;
a simulated right lung positioned within the right lung compartment, the simulated right lung being inflatable and deflatable to simulate functioning of a natural lung;
a right compression bag positioned within the right lung compartment adjacent to the simulated right lung, the right compression bag being inflatable and deflatable to occupy varying amounts of the right lung compartment in order to control a right lung compliance of the simulated right lung;
a left lung compartment;
a simulated left lung positioned within the left lung compartment, the simulated left lung being inflatable and deflatable to simulate functioning of a natural lung; and
a left compression bag positioned within the left lung compartment adjacent to the simulated left lung, the left compression bag being inflatable and deflatable to occupy varying amounts of the left lung compartment in order to control a left lung compliance of the simulated left lung.

25. The patient simulator of claim 24, wherein a control valve in communication with a source of pressurized air controls a volume of each of the right and left compression bags.

26. The patient simulator of claim 25, wherein the simulated right lung and the simulated left lung are each in communication with a simulated airway.

27. The patient simulator of claim 26, wherein the simulated airway leads to at least one of a simulated mouth and a simulated nose.

* * * * *